(12) United States Patent
Bradski et al.

(10) Patent No.: US 11,383,380 B2
(45) Date of Patent: *Jul. 12, 2022

(54) OBJECT PICKUP STRATEGIES FOR A ROBOTIC DEVICE

(71) Applicant: Intrinsic Innovation LLC, Mountain View, CA (US)

(72) Inventors: Gary Bradski, Palo Alto, CA (US); Steve Croft, Palo Alto, CA (US); Kurt Konolige, Menlo Park, CA (US); Ethan Rublee, Mountain View, CA (US); Troy Straszheim, Palo Alto, CA (US); John Zevenbergen, Palo Alto, CA (US); Stefan Hinterstoisser, Palo Alto, CA (US); Hauke Strasdat, Mountain View, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 16/687,106

(22) Filed: Nov. 18, 2019

(65) Prior Publication Data

US 2020/0078938 A1 Mar. 12, 2020

Related U.S. Application Data

(63) Continuation of application No. 15/968,323, filed on May 1, 2018, now Pat. No. 10,518,410, which is a
(Continued)

(51) Int. Cl.
*B25J 9/16* (2006.01)
*G06T 7/529* (2017.01)
(Continued)

(52) U.S. Cl.
CPC ............... *B25J 9/163* (2013.01); *B25J 5/00* (2013.01); *B25J 9/0093* (2013.01); *B25J 9/162* (2013.01);
(Continued)

(58) Field of Classification Search
CPC ...... G06T 7/55; G06K 9/00664; B25J 9/1664; B25J 19/021; G05B 2219/39391;
(Continued)

(56) References Cited

U.S. PATENT DOCUMENTS

| 4,785,153 A | 11/1988 | Stimmel |
| 4,831,549 A | 5/1989 | Red et al. |

(Continued)

FOREIGN PATENT DOCUMENTS

| CN | 103043359 A | * | 4/2013 | ............... B07C 5/00 |
| CN | 110977939 B | * | 5/2021 | ............... B25J 13/08 |

(Continued)

OTHER PUBLICATIONS

"Strategy-based robotic item picking from shelves;" Haifei Zhu, Yuan Yik Kok , Albert Causo, Keai Jiang Chee, Yuhua Zou, Sayyed Omar Kamal Al-Jufry, Conghui Liang, I-Ming Chen, Chien Chern Cheah, Kin Huat Low; 2016 IEEE/RSJ International Conference on Intelligent Robots and Systems (IROS) (pp. 2263-2270).*

(Continued)

*Primary Examiner* — Khoi H Tran
*Assistant Examiner* — Jorge O Peche
(74) *Attorney, Agent, or Firm* — McDonnell Boehnen Hulbert & Berghoff LLP

(57) ABSTRACT

Example embodiments may relate to methods and systems for selecting a grasp point on an object. In particular, a robotic manipulator may identify characteristics of a physical object within a physical environment. Based on the identified characteristics, the robotic manipulator may deter-
(Continued)

mine potential grasp points on the physical object corresponding to points at which a gripper attached to the robotic manipulator is operable to grip the physical object. Subsequently, the robotic manipulator may determine a motion path for the gripper to follow in order to move the physical object to a drop-off location for the physical object and then select a grasp point, from the potential grasp points, based on the determined motion path. After selecting the grasp point, the robotic manipulator may grip the physical object at the selected grasp point with the gripper and move the physical object through the determined motion path to the drop-off location.

20 Claims, 15 Drawing Sheets

Related U.S. Application Data continuation of application No. 15/093,118, filed on Apr. 7, 2016, now Pat. No. 9,987,746, which is a continuation of application No. 14/213,089, filed on Mar. 14, 2014, now Pat. No. 9,333,649.

(60) Provisional application No. 61/793,151, filed on Mar. 15, 2013, provisional application No. 61/798,425, filed on Mar. 15, 2013, provisional application No. 61/798,564, filed on Mar. 15, 2013, provisional application No. 61/798,505, filed on Mar. 15, 2013.

(51) Int. Cl.

| | |
|---|---|
| *G06T 7/593* | (2017.01) |
| *G06T 7/13* | (2017.01) |
| *G06T 17/00* | (2006.01) |
| *H04N 13/239* | (2018.01) |
| *G06T 7/55* | (2017.01) |
| *G06V 10/42* | (2022.01) |
| *G06V 10/44* | (2022.01) |
| *G06V 10/60* | (2022.01) |
| *G06V 10/24* | (2022.01) |
| *G06V 10/75* | (2022.01) |
| *G06V 20/10* | (2022.01) |
| *G06V 20/64* | (2022.01) |
| *B25J 19/02* | (2006.01) |
| *B65G 47/46* | (2006.01) |
| *B65G 47/50* | (2006.01) |
| *G01B 11/25* | (2006.01) |
| *G06T 7/60* | (2017.01) |
| *H04N 5/33* | (2006.01) |
| *B25J 9/00* | (2006.01) |
| *B25J 5/00* | (2006.01) |
| *B65G 41/00* | (2006.01) |
| *G06T 19/00* | (2011.01) |
| *B25J 19/00* | (2006.01) |
| *B65G 61/00* | (2006.01) |
| *B65H 67/06* | (2006.01) |
| *H04N 13/00* | (2018.01) |

(52) U.S. Cl.
CPC ........... *B25J 9/1612* (2013.01); *B25J 9/1664* (2013.01); *B25J 9/1671* (2013.01); *B25J 9/1687* (2013.01); *B25J 9/1694* (2013.01); *B25J 9/1697* (2013.01); *B25J 19/00* (2013.01); *B25J 19/021* (2013.01); *B65G 41/008* (2013.01); *B65G 47/46* (2013.01); *B65G 47/50* (2013.01); *G01B 11/254* (2013.01); *G06T 7/13* (2017.01); *G06T 7/529* (2017.01); *G06T 7/55* (2017.01); *G06T 7/593* (2017.01); *G06T 7/60* (2013.01); *G06T 17/00* (2013.01); *G06T 19/003* (2013.01); *G06V 10/242* (2022.01); *G06V 10/42* (2022.01); *G06V 10/44* (2022.01); *G06V 10/60* (2022.01); *G06V 10/751* (2022.01); *G06V 20/10* (2022.01); *G06V 20/64* (2022.01); *H04N 5/33* (2013.01); *H04N 13/239* (2018.05); *B65G 61/00* (2013.01); *B65H 67/065* (2013.01); *G05B 2219/31312* (2013.01); *G05B 2219/39391* (2013.01); *G05B 2219/40053* (2013.01); *G05B 2219/40298* (2013.01); *G05B 2219/40442* (2013.01); *G05B 2219/40543* (2013.01); *G06T 2200/04* (2013.01); *H04N 2013/0081* (2013.01); *Y10S 901/01* (2013.01); *Y10S 901/02* (2013.01); *Y10S 901/06* (2013.01); *Y10S 901/09* (2013.01); *Y10S 901/47* (2013.01)

(58) Field of Classification Search
CPC ..... Y10S 901/02; Y10S 901/01; B65G 61/00; B65H 67/065
See application file for complete search history.

(56) References Cited

U.S. PATENT DOCUMENTS

| | | | | |
|---|---|---|---|---|
| 5,501,571 | A | * | 3/1996 | Van Durrett ........... B65G 61/00 414/21 |
| 5,513,299 | A | | 4/1996 | Terasaki |
| 5,541,485 | A | | 7/1996 | Teichmann et al. |
| 5,924,582 | A | | 7/1999 | Miyata |
| 5,967,347 | A | | 10/1999 | Miyata |
| 5,992,751 | A | | 11/1999 | Laser |
| 6,072,466 | A | * | 6/2000 | Shah ...................... A63F 13/212 345/156 |
| 6,222,465 | B1 | * | 4/2001 | Kumar ................... G06F 3/017 341/20 |
| 6,493,607 | B1 | | 12/2002 | Bourne et al. |
| 6,526,373 | B1 | | 2/2003 | Barral |
| 7,099,745 | B2 | | 8/2006 | Ebert |
| 7,313,464 | B1 | | 12/2007 | Perreault |
| 7,366,585 | B2 | | 4/2008 | Schnoor |
| 7,587,082 | B1 | | 9/2009 | Rudin et al. |
| 7,706,918 | B2 | * | 4/2010 | Sato ....................... B25J 9/1612 318/568.1 |
| 7,818,091 | B2 | * | 10/2010 | Kazi ........................ G06T 7/73 700/262 |
| 7,957,583 | B2 | | 6/2011 | Boca et al. |
| 7,967,543 | B2 | | 6/2011 | Criswell et al. |
| 8,108,072 | B2 | | 1/2012 | Zhao et al. |
| 8,229,595 | B2 | | 7/2012 | Seelinger et al. |
| 8,276,739 | B2 | | 10/2012 | Bastian |
| 8,286,877 | B2 | * | 10/2012 | Olmstead ........... G06K 7/10574 235/462.14 |
| 8,306,314 | B2 | | 11/2012 | Tuzel et al. |
| 8,306,663 | B2 | | 11/2012 | Wickham |
| 8,360,318 | B2 | | 1/2013 | Reynolds et al. |
| 8,379,014 | B2 | | 2/2013 | Wiedemann et al. |
| 8,411,929 | B2 | | 4/2013 | Silver |
| 8,600,161 | B2 | | 12/2013 | Simon et al. |
| 9,013,483 | B2 | * | 4/2015 | Takemoto ............... G06T 11/60 345/426 |
| 9,102,053 | B2 | * | 8/2015 | Suzuki ................... B25J 9/1697 |
| 9,102,055 | B1 | * | 8/2015 | Konolige ............... G06V 10/42 |
| 9,227,323 | B1 | * | 1/2016 | Konolige ............... B25J 9/1697 |
| 9,289,897 | B2 | | 3/2016 | Mattern |
| 9,486,921 | B1 | * | 11/2016 | Straszheim ........... B25J 9/1679 |
| 9,821,458 | B1 | * | 11/2017 | Watts ..................... B25J 9/1612 |
| 9,878,446 | B2 | | 1/2018 | Scheurer |
| 10,275,543 | B1 | * | 4/2019 | Edsinger ................. G06F 30/17 |
| 10,332,183 | B1 | * | 6/2019 | Dogan .................. G06Q 10/087 |
| 10,335,947 | B1 | * | 7/2019 | Diankov ............... B25J 9/1687 |

(56) References Cited

U.S. PATENT DOCUMENTS

| | | | |
|---|---|---|---|
| 10,456,915 B1* | 10/2019 | Diankov | B25J 9/1612 |
| 10,618,172 B1* | 4/2020 | Diankov | B25J 9/1687 |
| 10,625,432 B2* | 4/2020 | Wagner | B25J 19/04 |
| 10,807,808 B1* | 10/2020 | Rodgers | B25J 9/0093 |
| 10,919,151 B1* | 2/2021 | Marchese | B65G 1/1373 |
| 2001/0052708 A1* | 12/2001 | Schmalz | B65G 61/00 294/65 |
| 2002/0150450 A1 | 10/2002 | Bivert et al. | |
| 2004/0101162 A1* | 5/2004 | Higaki | G06T 7/215 382/106 |
| 2004/0162639 A1* | 8/2004 | Watanabe | B25J 9/1697 700/259 |
| 2005/0226711 A1 | 10/2005 | Schnoor | |
| 2006/0104788 A1* | 5/2006 | Ban | G06T 1/0014 414/729 |
| 2006/0111811 A1* | 5/2006 | Okamoto | G05D 1/0255 700/214 |
| 2006/0167587 A1* | 7/2006 | Read | G05B 19/401 700/245 |
| 2007/0213874 A1* | 9/2007 | Oumi | B25J 9/1697 700/245 |
| 2007/0239315 A1* | 10/2007 | Sato | B25J 9/1612 700/245 |
| 2007/0282485 A1* | 12/2007 | Nagatsuka | G05B 19/4069 700/245 |
| 2008/0218515 A1* | 9/2008 | Fukushima | H04N 13/398 345/424 |
| 2008/0253612 A1* | 10/2008 | Reyier | B25J 9/1697 901/6 |
| 2008/0279446 A1 | 11/2008 | Hassebrook et al. | |
| 2008/0300723 A1 | 12/2008 | Ban et al. | |
| 2009/0048516 A1* | 2/2009 | Yoshikawa | A61B 8/461 600/443 |
| 2009/0066725 A1* | 3/2009 | Nogami | G06F 3/016 345/418 |
| 2009/0118864 A1 | 5/2009 | Eldridge et al. | |
| 2009/0306825 A1 | 12/2009 | Li | |
| 2010/0004778 A1* | 1/2010 | Arimatsu | G06T 1/0014 700/214 |
| 2010/0092267 A1 | 4/2010 | Najdovski et al. | |
| 2010/0114338 A1* | 5/2010 | Bandyopadhyay | B23K 37/0258 700/36 |
| 2010/0286827 A1 | 11/2010 | Franzius et al. | |
| 2010/0292822 A1* | 11/2010 | Hahn | G05B 19/40937 700/98 |
| 2011/0010009 A1* | 1/2011 | Saito | B25J 9/1612 703/13 |
| 2011/0123122 A1* | 5/2011 | Agrawal | G06T 7/74 382/203 |
| 2011/0157178 A1* | 6/2011 | Tuzel | G06T 7/586 345/426 |
| 2011/0320039 A1 | 12/2011 | Hsu et al. | |
| 2012/0095322 A1 | 4/2012 | Tsekos et al. | |
| 2012/0165972 A1 | 6/2012 | Wappling | |
| 2012/0230668 A1* | 9/2012 | Vogt | H04N 5/2251 396/428 |
| 2012/0239194 A1 | 9/2012 | Kagawa | |
| 2012/0290131 A1 | 11/2012 | Khoukhi | |
| 2012/0294510 A1 | 11/2012 | Zhang et al. | |
| 2012/0296469 A1* | 11/2012 | Yoshinaga | B25J 15/0616 700/218 |
| 2013/0010081 A1 | 1/2013 | Tenney et al. | |
| 2013/0041508 A1 | 2/2013 | Hu et al. | |
| 2013/0057004 A1 | 3/2013 | Murata | |
| 2013/0147944 A1* | 6/2013 | Zhang | B25J 9/1687 348/95 |
| 2013/0151007 A1 | 6/2013 | Valpola et al. | |
| 2013/0178978 A1 | 7/2013 | Kim | |
| 2013/0211593 A1* | 8/2013 | Domae | B25J 9/1612 700/258 |
| 2013/0238124 A1* | 9/2013 | Suzuki | B25J 9/1697 700/250 |
| 2013/0238125 A1* | 9/2013 | Suzuki | B25J 9/1697 700/253 |
| 2013/0335535 A1 | 12/2013 | Kane et al. | |
| 2013/0345870 A1 | 12/2013 | Buehler et al. | |
| 2013/0346348 A1* | 12/2013 | Buehler | B25J 9/1671 901/31 |
| 2014/0012415 A1 | 1/2014 | Benaim et al. | |
| 2014/0017048 A1* | 1/2014 | Mattern | G06T 1/0014 414/730 |
| 2014/0019392 A1 | 1/2014 | Buibas | |
| 2014/0025198 A1* | 1/2014 | Mattern | B25J 9/1697 700/228 |
| 2014/0079524 A1* | 3/2014 | Shimono | B25J 9/1669 414/801 |
| 2014/0154036 A1* | 6/2014 | Mattern | B25J 9/0084 414/816 |
| 2014/0234066 A1 | 8/2014 | Mathi | |
| 2014/0316573 A1* | 10/2014 | Iwatake | B25J 9/1697 700/258 |
| 2014/0371905 A1 | 12/2014 | Eberst | |
| 2015/0039129 A1 | 2/2015 | Yasuda | |
| 2015/0202776 A1* | 7/2015 | Atohira | B25J 9/1671 901/47 |
| 2015/0262012 A1* | 9/2015 | Kim | G06T 7/75 382/103 |
| 2015/0273688 A1* | 10/2015 | Harada | B25J 9/1612 700/259 |
| 2015/0332213 A1* | 11/2015 | Galluzzo | B25J 15/06 700/218 |
| 2015/0352717 A1* | 12/2015 | Mundt | B25J 9/1664 414/730 |
| 2015/0352719 A1 | 12/2015 | Nakazato | |
| 2015/0352721 A1* | 12/2015 | Wicks | B25J 9/1687 700/228 |
| 2016/0132059 A1* | 5/2016 | Mason | G05D 1/0291 701/28 |
| 2016/0136807 A1 | 5/2016 | Scheurer | |
| 2016/0136816 A1* | 5/2016 | Pistorino | B07C 5/3422 700/223 |
| 2016/0259341 A1* | 9/2016 | High | H04W 4/33 |
| 2016/0279791 A1* | 9/2016 | Watanabe | G06V 20/64 |
| 2017/0008172 A1* | 1/2017 | Cronie | B25J 9/1669 |
| 2017/0066133 A1* | 3/2017 | Ooba | G05B 19/4182 |
| 2017/0121113 A1* | 5/2017 | Wagner | G06K 7/1443 |
| 2017/0154430 A1* | 6/2017 | Yoshii | B25J 9/1697 |
| 2017/0369244 A1* | 12/2017 | Battles | B65G 47/902 |
| 2018/0040132 A1* | 2/2018 | Eto | G05B 19/4189 |
| 2018/0079081 A1* | 3/2018 | Chen | B25J 9/0003 |
| 2018/0085922 A1* | 3/2018 | Ooba | B25J 9/1679 |
| 2018/0178386 A1* | 6/2018 | Eto | B65G 67/24 |
| 2019/0023501 A1* | 1/2019 | Oowatari | B65G 47/1457 |
| 2019/0026537 A1* | 1/2019 | Arisoy | G06T 7/60 |
| 2019/0050694 A1* | 2/2019 | Fukagai | G06T 7/74 |
| 2019/0077011 A1* | 3/2019 | Sezaki | B25J 9/0093 |
| 2019/0091869 A1* | 3/2019 | Yamazaki | B25J 9/1679 |
| 2019/0099891 A1* | 4/2019 | Tomioka | B25J 9/1664 |
| 2019/0184559 A1* | 6/2019 | Lager | G05B 19/4182 |
| 2019/0220000 A1* | 7/2019 | Ibe | G05D 1/0297 |
| 2019/0283241 A1* | 9/2019 | Eto | B65G 61/00 |
| 2019/0291282 A1* | 9/2019 | Marchese | B25J 15/0019 |
| 2019/0389082 A1* | 12/2019 | Higo | B25J 19/023 |
| 2020/0020093 A1* | 1/2020 | Frei | B64D 47/08 |
| 2020/0061839 A1* | 2/2020 | Deyle | G06Q 10/087 |
| 2020/0078941 A1* | 3/2020 | Oka | B25J 9/1666 |
| 2020/0117898 A1* | 4/2020 | Tian | G06F 3/04815 |
| 2020/0134828 A1* | 4/2020 | Diankov | G06V 10/255 |
| 2020/0143127 A1* | 5/2020 | Wagner | B65G 47/46 |
| 2020/0171655 A1* | 6/2020 | Lin | B25J 9/1612 |
| 2020/0215685 A1* | 7/2020 | Jamali | B25J 9/1697 |
| 2020/0223066 A1* | 7/2020 | Diankov | G06Q 10/083 |
| 2020/0300619 A1* | 9/2020 | Cosneau | G06T 7/62 |
| 2020/0316782 A1* | 10/2020 | Chavez | B25J 9/1612 |
| 2020/0377312 A1* | 12/2020 | Diankov | B65G 61/00 |
| 2020/0391385 A1* | 12/2020 | Oka | B25J 13/085 |
| 2021/0023717 A1* | 1/2021 | Yu | G06V 10/443 |
| 2021/0046655 A1* | 2/2021 | Deyle | B25J 9/1697 |

(56) References Cited

U.S. PATENT DOCUMENTS

| | | | |
|---|---|---|---|
| 2021/0048829 A1* | 2/2021 | Deyle | G05D 1/0246 |
| 2021/0053230 A1* | 2/2021 | Mizoguchi | B25J 9/1612 |
| 2021/0178583 A1* | 6/2021 | Ye | G06T 7/60 |

FOREIGN PATENT DOCUMENTS

| | | | | |
|---|---|---|---|---|
| CN | 113492403 A | * | 10/2021 | B25J 13/089 |
| DE | 10324755 | | 9/2004 | |
| DE | 102006031178 A1 | * | 1/2007 | B25J 9/0093 |
| DE | 112017007397 B4 | * | 9/2021 | B25J 9/1612 |
| DE | 102021107532 A1 | * | 10/2021 | B25J 9/163 |
| EP | 2156927 | | 2/2010 | |
| KR | 2017-0013925 A | * | 2/2017 | |
| WO | 2007/050776 | | 5/2007 | |
| WO | 2013/065003 | | 5/2013 | |
| WO | WO 2016/060716 A2 | * | 4/2016 | |

OTHER PUBLICATIONS

"A 3D perception-based robotic manipulation system for automated truck unloading;" Paul Doliotis, Christopher D. McMurrough, Alex Criswell, Matthew B. Middleton, Samarth T. Rajan; 2016 IEEE International Conference on Automation Science and Engineering (CASE) (pp. 262-267); Aug. 1 2016.*

Agarwal, Sameer, Mierle, Keir, and others: Ceres Solver. http://code.google.com/p/ceres-solver, last accessed Apr. 22, 2014, 2 pages*.

Curless, Brian et al., "A Volumetric Method for Building Complex Models from Range Images," Proceedings of the 23rd annual conference on Computer Graphics and Interactive Techniques, ACM, New York, New York, Aug. 4-9, 1996, pp. 303-312*.

Davis, James et al., "Spacetime Stereo: A Unifying Framework for Depth from Triangulation," IEEE Transactions on Pattern Analysis and Machine Intelligence, Feb. 2005, pp. 296-302, vol. 27, No. 2*.

Greene, D. H., The decomposition of polygons into convex parts, in Computational Geometry, ser. Adv. Comput. Res., F. P. Preparata, Ed. Greenwich, CT: JAI Press, 1983, pp. 235-259, vol. 1*.

Hoppe, H. et al., Surface Reconstuction from Unorganized Points, Computer Graphics (SIGGRAPH'92 proceedings), Jul. 1992, pp. 71-78, vol. 26, No. 2*.

Jimenez, P. et al., "3D Collision Detection: a Survey," Computers & Graphics, 2001, pp. 269-285, vol. 25, No. 2*.

John. J. Craig. "Introduction to robotics: mechanics and control." Addison-Wesley Publishing Company. Inc., Reading, MA, 1989, Chapters 3, 4 and 7, pp. 68-151 and 227-261*.

Konolige, Kurt, "Projected Texture Stereo," Proceedings of the 2010 IEEE International Conference on Robotics and Automation (ICRA), May 3-7, 2010, p. 148-155*.

Kuffner, J. "RRT-connect: An Efficient Approach to Single-Query Path Planning", IEEE International Conference on Robotics and Automation, 2000, pp. 1-7*.

Lorensen et al., "Marching Cubes: A High Resolution 3D Surface Construction Algorithm," Computer Graphics, Jul. 1987, p. 163-169, vol. 21, No. 4*.

Marns, Jack, Automated robotic truck loader optimizes shipping space, Smart Packaging, Jan. 1, 2012, http://www.packagingdigest.com/smart-packaging/automated-robotic-truck-loader-optimizes-shipping-space*.

Newcombe et al., "KinectFusion: Real-Time Dense Surface Mapping and Tracking," Proceedings of the 2011 10th 12 IEEE International Symposium on Mixed and Augmented Reality, IEEE Computer Society, Washington, DC, 2011, p. 127-136*.

Nießner, M. et al., "Real-time 3D Reconstruction at Scale using Voxel Hashing," ACM Transactions on Graphics (TOG), 2013*.

Okutomi et al., "A Multiple-Baseline Stereo," IEEE Transactions on Pattern Analysis and Machine Intelligence, Apr. 1993, pp. 353-363, vol. 15, No. 4*.

Schulman, John et al., "Finding Locally Optimal, Collision-Free Trajectories with Sequential Convex Optimization," Robotics: Science and Systems (RSS), 2013, 10 pages*.

Tsai et al., "A Single-Pixel Wireless Contact Lens Display," IEEE Transactions on Robotics and Automation, 1989, pp. 345-358*.

* cited by examiner

OBJECT PICKUP STRATEGIES FOR A ROBOTIC DEVICE

CROSS REFERENCE TO RELATED APPLICATION

The present application claims priority to U.S. patent application Ser. No. 15/968,323, filed on May 1, 2018 and entitled "Object Pickup Strategies for a Robotic Device," which is hereby incorporated by reference in its entirety. U.S. patent application Ser. No. 15/968,323 claims priority to U.S. patent application Ser. No. 15/093,118, filed on Apr. 7, 2016 and entitled "Object Pickup Strategies for a Robotic Device," which is hereby incorporated by reference in its entirety. U.S. patent application Ser. No. 15/093,118 then claims priority to U.S. patent application Ser. No. 14/213,089, filed on Mar. 14, 2014 and entitled "Object Pickup Strategies for a Robotic Device," which is hereby incorporated by reference in its entirety. U.S. patent application Ser. No. 14/213,089 then claims priority to U.S. Provisional patent application Ser. No. 61/793,151 filed on Mar. 15, 2013 and entitled "Mixed Case Palletizing and Truck Loading/Unloading," U.S. Provisional patent application Ser. No. 61/798,425 filed on Mar. 15, 2013 and entitled "Environment Reconstruction and Trajectory Planning," U.S. Provisional patent application Ser. No. 61/798,564 filed on Mar. 15, 2013 and entitled "Object Reconstruction and Detection," and U.S. Provisional patent application Ser. No. 61/798,505 filed on Mar. 15, 2013 and entitled "Optical Sensors," which are each hereby incorporated by reference in its entirety.

BACKGROUND

Unless otherwise indicated herein, the materials described in this section are not prior art to the claims in this application and are not admitted to be prior art by inclusion in this section.

Robotic systems, such as a robotic arm containing a gripping component, may be used for applications involving picking up or moving objects. For instance, a robotic device may be used to fill a container with objects, create a stack of objects, or unload objects from a truck bed. In some cases, all of the objects may be of the same type. In other cases, a container or truck may contain a mix of different types of objects, such as boxed items, cans, tires, or other stackable objects. Such robotic systems may direct a robotic arm to pick up objects based on predetermined knowledge of where objects are in the environment.

SUMMARY

A robotic device may include a robotic arm that may be equipped with a gripper, such as a suction gripper, in order to move objects to specified locations. In some examples, a grasp point on the object may be selected for the gripper based on global considerations such as motion planning and collision avoidance, among other possibilities. Therefore, a robotic device may be configured to identify characteristics of the object and the physical environment in order to determine potential grasp points on the object. The robotic device may also be configured to determine a motion path for the gripper to follow in order to place the object at a drop-off location. The robotic device may then be configured to select a grasp point from the potential grasp points based on a variety of factors such as the determined motion path.

In one aspect, a method is provided. The method involves identifying one or more characteristics of a physical object within a physical environment. The method also involves, based on the identified one or more characteristics, determining one or more potential grasp points on the physical object, by a computing device, corresponding to points at which a gripper attached to a robotic manipulator is operable to grip the physical object. Additionally, the method involves determining a motion path for the gripper to follow in order to move the physical object to a drop-off location for the physical object. Further, the method also involves selecting a grasp point from the one or more potential grasp points based on the determined motion path. Yet further, the method also involves providing instructions to cause the robotic manipulator to grip the physical object at the selected grasp point with the gripper and move the physical object through the determined motion path to the drop-off location.

In another aspect, a system is provided. The system includes a robotic manipulator, a gripper attached to the robotic manipulator, and a control system configured to perform functions. The functions include identifying one or more characteristics of a physical object within a physical environment. The functions also include, based on the identified one or more characteristics, determining one or more potential grasp points on the physical object corresponding to points at which the gripper is operable to grip the physical object. Additionally, the functions also include determining a motion path for the gripper to follow in order to move the physical object to a drop-off location for the physical object. Further, the functions also include selecting a grasp point from the one or more potential grasp points based on the determined motion path. Yet further, the functions also include providing instructions to cause the robotic manipulator to grip the physical object at the selected grasp point with the gripper and move the physical object through the determined motion path to the drop-off location.

In yet another aspect, a non-transitory computer readable medium is provided. The non-transitory computer readable medium has stored therein instructions, that when executed by a computing device, cause the computing device to perform functions. The functions include identifying one or more characteristics of a physical object within a physical environment. The functions also include, based on the identified one or more characteristics, determining one or more potential grasp points on the physical object corresponding to points at which a gripper attached to a robotic manipulator is operable to grip the physical object. Additionally, the functions also include determining a motion path for the gripper to follow in order to move the physical object to a drop-off location for the physical object. Further, the functions also include selecting a grasp point from the one or more potential grasp points based on the determined motion path. Yet further, the functions also include providing instructions to cause the robotic manipulator to grip the physical object at the selected grasp point with the gripper and move the physical object through the determined motion path to the drop-off location.

In yet another aspect, a system is provided. The system may include: (a) means for identifying one or more characteristics of a physical object within a physical environment, (b) means for, based on the identified one or more characteristics, determining one or more potential grasp points on the physical object corresponding to points at which a gripper attached to a robotic manipulator is operable to grip the physical object, (c) means for determining a motion path for the gripper to follow in order to move the physical object to a drop-off location for the physical object, (d) means for selecting a grasp point from the one or more potential grasp points based on the determined motion path, and (e) means for providing instructions to cause the robotic manipulator to grip the physical object at the selected grasp point with the gripper and move the physical object through the determined motion path to the drop-off location.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1A:
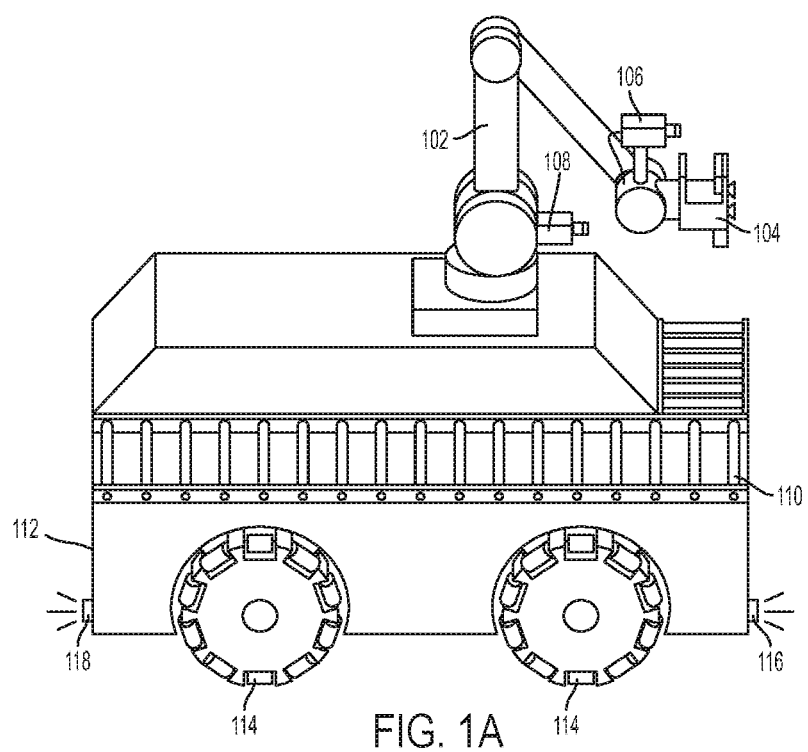
FIG. 1A shows a robotic arm mounted on a moveable cart, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

Example embodiments provide for object pickup strategies involving a robotic device such as a robotic arm with a gripping component or other end effector. Object pickup and movement strategies may be useful in various aspects of industry such as manufacturing, transport, and delivery of consumer goods. For example, loading a heavy box onto a truck may be a suitable task for a robotic arm. Therefore, it may be desirable to select a grasp point for the gripping component on the box that allows the robotic device to move the box through a determined motion path while avoiding collisions with nearby objects or people, among other possible factors.

A robotic arm may be equipped with a gripper such as a suction type gripper. The suction gripper may be controlled in various ways, such as remote sensing, to grasp onto an object like a box. In particular, the gripper may be a digital suction grid gripper that may be configured to grasp onto multiple boxes, including multiple boxes of different heights. Additionally, the gripper may be configured to grasp onto irregular surfaces while ensuring that the object is not dropped.

In many cases, a robotic arm may be equipped with various sensors that allow for analysis of the object and the environment, as well as 3D ("virtual") reconstruction of the object and the environment. Such virtual reconstruction may allow for identification of various characteristics of the object as well as determination of potential grasp points on the object. Potential grasp points on the object may correspond to points at which the gripper is operable to grip the physical object. Additionally, the robotic arm may evaluate local considerations such as other objects in the environment. For example, other objects in the environment may include adjacent boxes, or a bin in which the object is placed, among other possibilities. As a result, the robotic arm may determine an approach towards the object as well as potential grasp points based on such additional considerations.

Further, the robotic arm may be configured to determine a motion path for the gripper to follow so that the robotic arm can move the object to a particular drop-off location (e.g., a container or truck). The motion path may be determined based on a variety of techniques such as using a path planning algorithm. In particular, a path planning algorithm may involve constraints such as planning a collision-free path as well as determining the quickest movement path, among others.

Once the motion path has been determined, the robotic arm may then use global considerations, such as the motion path and any other factors, to select a grasp point. For example, any potential grasp points that would result in a collision of the robotic with a nearby obstructing object when the robotic arm moves towards the object (e.g., the box) to be grasped, may be rejected. In another example, any potential grasp points that would result in a collision with a nearby obstructing object when the robotic arm moves the object (e.g., the box) through the determined motion path, may be rejected. In yet another example, accommodation of the object at the drop-off location may also be considered for selection of the grasp point. Once the grasp point has been selected, the robotic arm may grip the object and move it through the motion path to the drop-off location.

II. Example Robotic Device

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

According to various embodiments, described herein are methods and systems for automated loading and/or unloading of boxes and/or other objects, such as into a storage container or from a vehicle. In some example embodiments, boxes or objects may be automatically organized and placed onto pallets. Within examples, automating the process of loading/unloading trucks and/or the process of creating pallets from objects for easier storage and transport may provide a number of industrial and business advantages.

According to various embodiments, automating the process of loading/unloading trucks and/or the process of creating pallets may include the incorporation of one or more robotic devices to move objects or perform other functions. In some embodiments, a robotic device can be made mobile by coupling with a wheeled base, a holonomic base (e.g., a base that can move in any direction), or rails on the ceiling, walls or floors. In some embodiments, the base can be an elevated base.

In some examples, a system including one or more sensors, one or more computers, and one or more robotic arms is described. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

As used herein, the term "boxes" will refer to any object or item that can be placed onto a pallet or loaded onto or unloaded from a truck or container. For example, in addition to rectangular solids, "boxes" can refer to cans, drums, tires or any other "simple" shaped geometric items. Additionally, "loading" and "unloading" can each be used to imply the other. For example, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

According to various embodiments, a robotic manipulator may be mounted on a holonomic cart (e.g., a cart with wheels that allow the cart to move in any direction). FIG. 1A depicts an exemplary holonomic cart containing a robotic manipulator. In some embodiments, a moveable cart 112 may include a robotic arm 102 mounted on the cart 112. The robotic arm 102 may contain a gripping component 104 for gripping objects within the environment. The cart may contain one or more wheels 114, which may be holonomic wheels that operate with two degrees of freedom. In further embodiments, a wrap around front conveyor belt 110 may be included on the holonomic cart 112. In some examples, the wrap around front conveyor belt may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example embodiments, one or more robotic manipulators may be mounted on rails of a truck or container. In such examples, the robotic manipulators may be used to load or unload the truck or container.

Figure 1B:
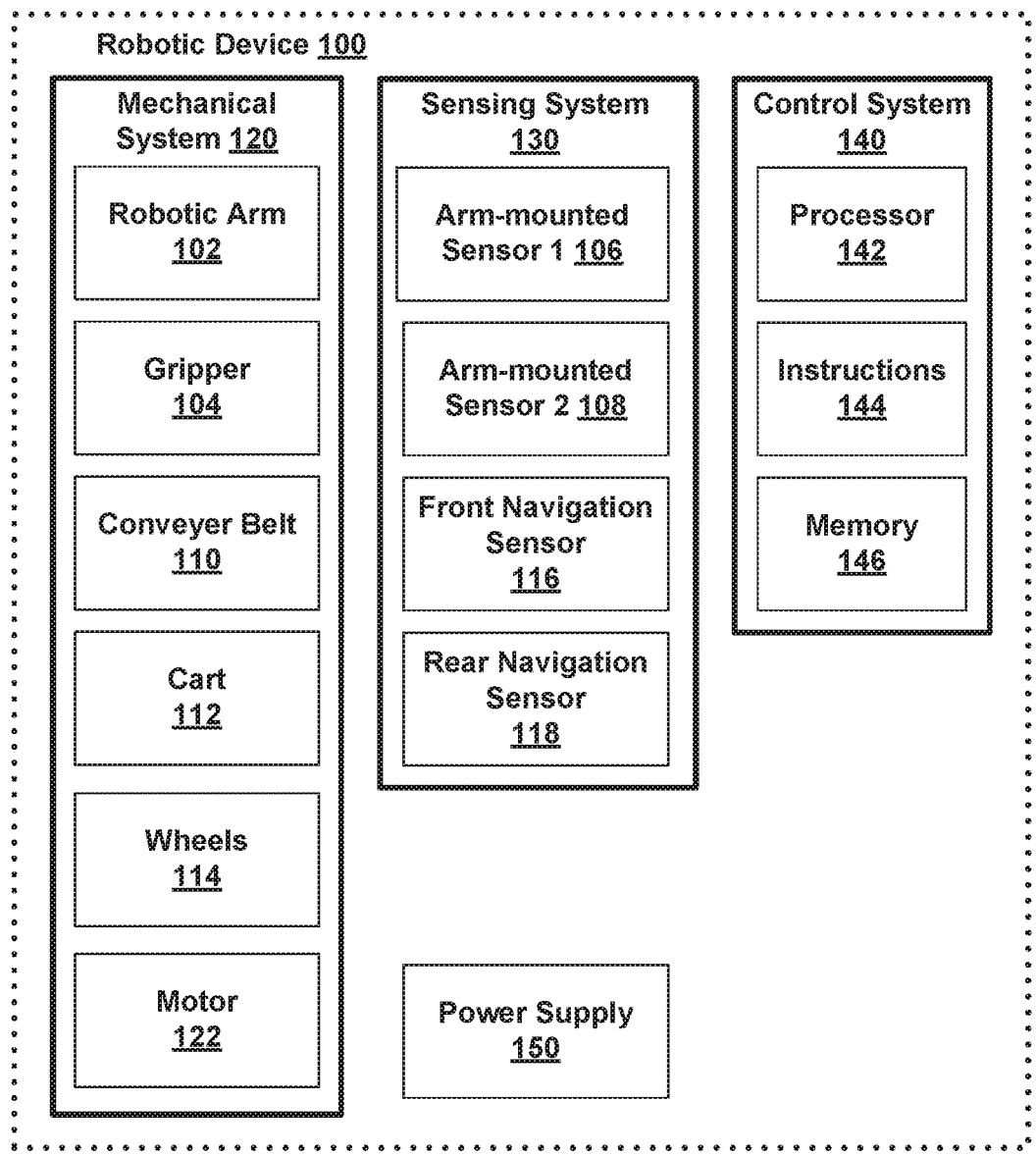
FIG. 1B is a functional block diagram illustrating a robotic device, according to an example embodiment.

FIG. 1B is a functional block diagram illustrating a robotic device 100, according to an example embodiment. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some further examples, additional functional and/or physical components may be added to the examples illustrated by FIGS. 1A and 1B.

The mechanical system 120 may include components described above with respect to FIG. 1A, including a robotic arm 102, a gripper 104, a conveyer belt 110, a (movable or holonomic) cart 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system may determine information about the environment that can be used by control system 140 (e.g., a computer running motion planning software) to pick and move boxes efficiently. The control system 140 could be located on the device or could be in remote communication with the device. In further examples, scans from one or more 2D or 3D sensors with fixed mounts on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading.

In additional examples, planar surface information may be extracted from 3D sensors to model walls, floor and/or box faces. After modeling the floor, projection of objects onto the floor plane may enable segmentation of obstacles and/or target objects such as boxes. Floor-plane projection can also be used to model the corrugated sides of a container or truck, which may not be accurately modeled as planes. In further examples, sidewall angles, floor plane roll and pitch, and/or distance from side walls can be used to maneuver a mobile base into a container without collisions. Use of extended 3D information rather than a single line scan may help make the extraction of navigation information robust. For example, the side walls may have a vertical extent that is captured by the 3D sensor. Scanning systems that use a single line of depth information may be slower if they scan vertically and/or less robust because they acquire less information. In additional examples, front plane modeling can determine the distance to a next group of objects to pick in truck unloading.

In further examples, the robotic arm 102 may be equipped with a gripper 104, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

In some embodiments, the gripper could potentially span several boxes or objects and turn on suction for some or all of the covered objects. In some embodiments, the suction or adhesion devices may be a "digital" grid so that the robotic device can turn on any number of the suction devices as will fit boxes sensed for grabbing. In some implementations, the system may notice a seam in the boxes (separation between adjacent boxes) such that suckers can be activated on both sides of the seam to pick up both boxes at once, thereby doubling the throughput. In some embodiments, the suckers can sense after a certain amount time whether they can successfully grip a surface, after which they may automatically shut off. In further embodiments, sections of the suckers can fold down to grasp the top of the boxes. For instance, grippers can initially start at full extension and then conform to the surface being gripped.

In further examples, the robotic arm can implement a wiggle movement to improve a suction grip. In additional embodiments, the robotic arm can wiggle a box side to side to help segment the box from its surroundings. In other embodiments, the arm can wiggle upon pick up of the box to avoid jostling other objects. In such embodiments, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air.

According to various embodiments, cardboard boxes can have concave, convex or otherwise rumpled faces that make it hard for a suction device to adhere to. Thus, wiggling the suction device as the device makes suction contact may enable a more reliable grip on cardboard boxes and other non-planar objects. In further examples, when first grabbing a box, a few center suction devices can be turned on and the arm can wiggle back and forth as it starts to pull the box out. This may break surface adhesion with other boxes and help to start to pull the box out. Once the box is at least partially pulled out, the box may then be segmented from the other boxes more easily. In some embodiments, wiggling while picking up an object in clutter may remove other objects from the picked up object, thereby preventing unwanted pick up of surrounding objects.

According to various embodiments, segmentation of items may be necessary for successful grasping. In some embodiments, a smooth surface patch may belong to two separate objects. In such instances, manipulator interaction with the objects may be used to perturb the scene to better segment the objects from each other. For motion separation, the natural or forced movement of objects on a conveyor, on a slide, moving in a tote, and/or actively jostled within a tote may be tracked by optical flow, parallax, or time delayed views to calculate stereo depth in order to enhance object segmentation.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various embodiments, cues such as barcodes, texture coherence, color, 3D surface properties, or printed text on the surface may also be used to identify an object and/or find its pose in order to know where and/or how to place the object (e.g., fitting the object into a fixture receptacle). In some embodiments, shadow or texture differences may be employed to segment objects as well.

Many or all of the functions of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some embodiments, memory 146 may contain instructions 144 (e.g., program logic) executable by the processor 142 to execute various functions of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

Figure 2A:
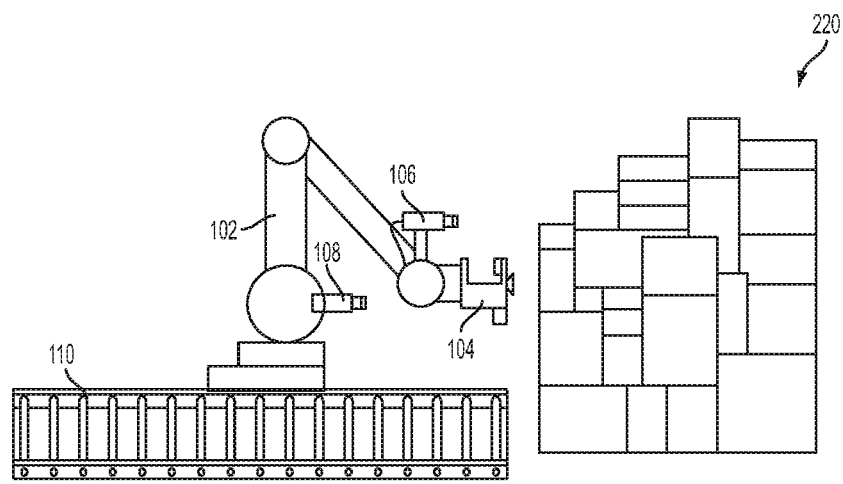
FIG. 2A shows a robotic arm and a stack of boxes, according to an example embodiment.

According to various embodiments, a perception guided robot is described. For instance, a robotic device may utilize a combination of perception together with planning to guide the robot arm to pick up a box and place it where it needs to go. FIG. 2A illustrates part of the robotic device from FIG. 1A with a stack of boxes, according to an example embodiment. As shown, the robotic device may include a robotic arm 102 with a gripping component 104, sensors 106 and 108, and conveyer 110 as described above. In some examples, the robotic device could be mounted on a holonomic cart as described with respect to FIG. 1A, could be mounted on a different type of movable apparatus, could be mounted on rails or tracks, or could be stationary. The robotic device may be controlled to pick boxes from a stack of boxes 220 containing a heterogenous mix of shapes and sizes of boxes.

Figure 2B:
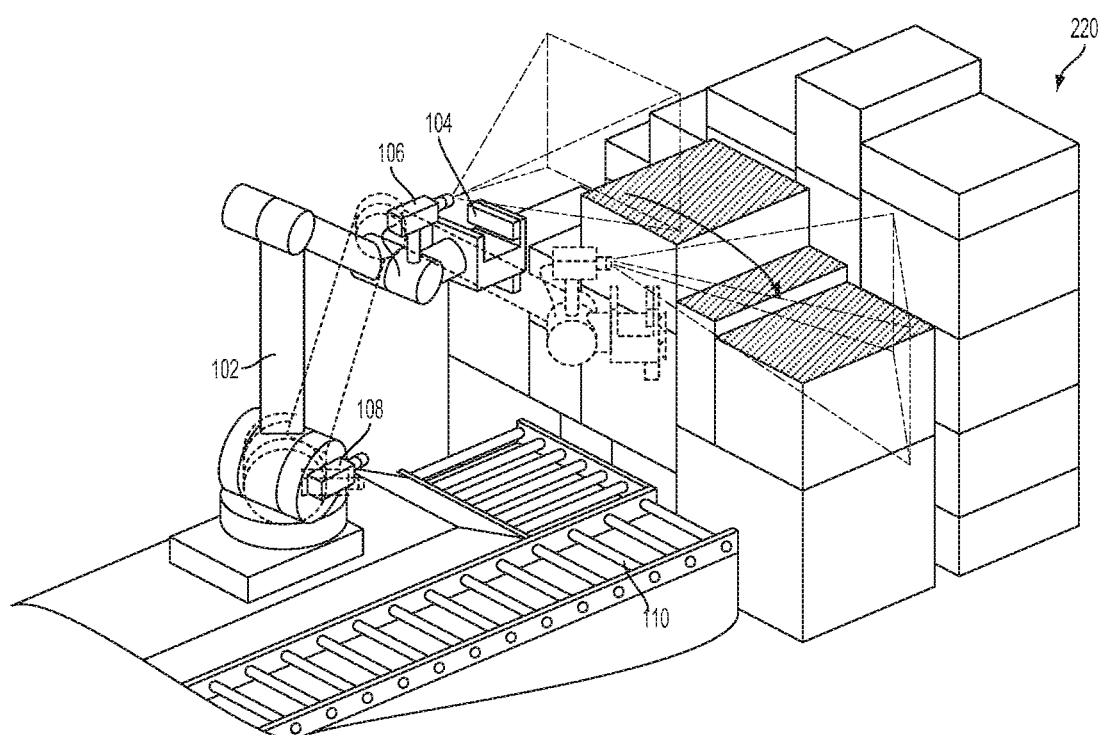
FIG. 2B shows scanning of the stack of boxes from FIG. 2A by a sensor mounted on the robotic arm, according to an example embodiment.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various embodiments, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking keypoints in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may make possible better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect where objects of interest are. Also, mathematical representations of objects may be used to look for anomalies such as when person enters into an environment. Such events may violate the ideal model, which may make their detection easier.

In other examples, certain objects such as boxes may have simple planar form. For instance, a metal may have a geometric form of a cylinder and a tire may have a geometric form of a torus. Example systems may leverage this trait of certain objects in order model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map of distances as the third dimension). Examples of facades may include the wall of boxes in a truck, the top of a pallet stack containing boxes or other objects, or the top of a bin of jumbled objects.

Figure 2C:
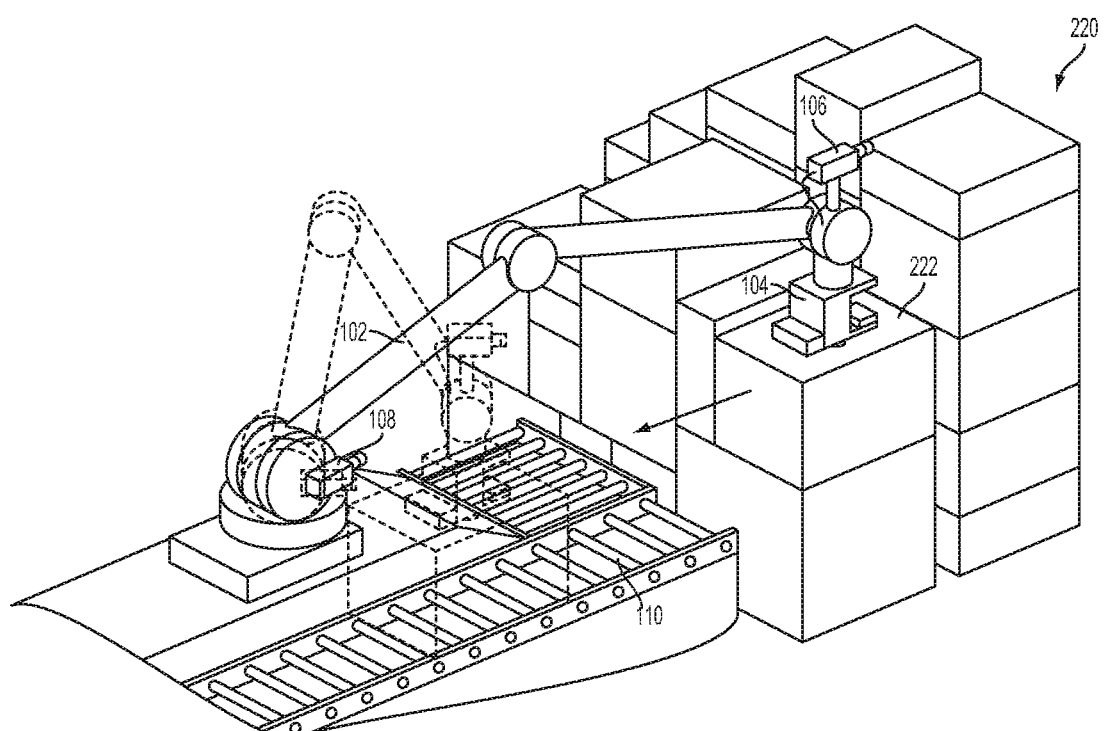
FIG. 2C shows the robotic arm from FIG. 2A moving a box, according to an example embodiment.

In further examples, a facade may be constructed from boxes, for instance to plan in what order the boxes should be picked up. For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensor 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyer belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick may be determined based on a facade representation. In other examples, an orthographic projection of integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a cart base or fixed locations may be combine to create a single facade of the boxes to be picked.

In other examples, the 3D model may be used for collision avoidance. Within examples, planning a collision-free path may involve determining the 3D location of objects and surfaces in the environment. A path optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the path.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path.

An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some embodiments, path constraints, such as collision avoidance for robotic arms, cameras, cables, and/or other components, may be put in a constraint based planning solver and solved for to yield a best path to move the arm for perception. Additionally, in some embodiments, the solver may determine a best path for picking up, moving, and placing an object.

According to various embodiments, 3D and/or visual sensors may be calibrated to determine their pose with respect to the workspace. In the case of fixed sensors, the calibration may determine their fixed pose in the workspace. In the case of a sensor on the arm, calibration may determine the offset pose of the sensor from the arm link to which it is attached.

Within examples, calibration techniques may allow for the calibration of an arbitrary number of sensors in the workspace. Calibration may involve determining some or all of a variety of parameters and coefficients. For example, calibration may solve for one or more intrinsic parameters such as focal length and image center. As another example, calibration may determine one or more distortion coefficients such as models of radial and tangential distortion. As yet another example, calibration may solve for one or more extrinsic parameters, where the object is in a scene relative to a pattern or other sensors that identified the same pattern in a scene.

In some examples, calibration may be performed at least in part by using a calibration pattern, which may be a known set of features in 2D or 3D. For instance, a known pattern of dots may be used, where the distance between each dot and the other dots is known. Calibration may be performed at least in part by collecting multiple different views of an object. In further examples, capturing multiple views of a calibration pattern in different positions may allow for (1) calibration of the one or more coefficients of the camera and/or (2) knowledge of where the camera is relative to the coordinate system established by where the calibration pattern was fixed. In particular embodiments, a camera in the scene may identify a calibration pattern on the robot arm while a camera on the arm identifies a calibration pattern in the scene simultaneously.

In additional examples, calibration may involve a camera fixed in a scene. In this case, a calibration pattern may be placed on a robotic arm. The robotic arm may be configured to move through the scene as multiple views of the calibration pattern on the robotic arm are collected. This may help to calibrate the camera and/or be useful for relating the coordinate system of the camera to that of the robot. Further, the relation of each device to the other can be determined by each device as the robotic arm moves.

In certain examples, calibration may involve a camera located on a robotic arm. A calibration pattern may be mounted on a wall or table. Then, the camera may be moved around, collecting multiple views of the calibration pattern from different robot or robotic arm positions. When different 3D or 2D views (e.g., 2, 20, 200) are collected, these views can be used to solve for the calibration relationships. After calibration, when the camera on the arm moves, the system can determine where it is relative to the coordinate system set based on the location of the calibration pattern in the scene. In particular embodiments, both the calibration pattern and the camera may be movable. For example, the calibration pattern may be located on a conveyor belt where the robotic arm may be configured to place boxes. After calibration, the system may determine where the camera was relative to that spot on the conveyor belt.

In further examples, nonlinear optimization may be performed in a two-stage process for robust estimation of 3D sensor calibration. In one stage, an initialization may be derived from the relative pose offsets of the target and the sensors. In another stage, given the initialization, a batch bundle adjustment may be used to find the optimal pose of the cameras together with the target points. Calibration can be extended to the estimation of robot parameters such as joint lengths and joint angle offsets.

In other examples, known, precise, robot motion of the camera over a calibration pattern, or a calibration pattern over a camera may be used to improve calibration results. For instance, information about precisely how the camera moves may be used to obtain more accurate camera calibration. That is, if the camera is moved 50 mm right, the corresponding (perspective projection) amount of movement from the calibration object may be detected. This information may be used to jointly or separately optimize the calibration and tracking parameters.

In additional examples, a robot can look at its ongoing calibration and move in such a way as to maximize information for better calibration. For example, it can detect that some view areas have not been seen and go to those views.

In further examples, a system for the practical manipulation of heterogeneous, categorical items, generally from a cluttered collection area to a defined bin, is presented. In some embodiments, the pick location containing the items may not be sensitive to precise object orientation(s) and items may be mixed together. In additional examples, the place location for the items may or may not be sensitive to object orientation. In some examples, the pick-and-place regions may be defined as 3D regions acceptable for picking or placing an object, with some tolerance. The pick-and-place region may be highly cluttered with similar and/or disparate objects. In other embodiments, the items may come from or be put into a fixture, such as metal or plastic snaps that hold the sorted item in a particular orientation.

In additional examples, environment modeling of both the pick-and-place location may be used for intelligent grasp location and motion, as well as event reporting (e.g., when a place region is full or a pick region is empty). In some examples, object bounding volumes may be computed and/or distinguishing features of objects may be found (such as textures, colors, barcodes or OCR). In some embodiments, objects may be sorted into an assigned destination location by matching against a database of location assignments indexed by object type or object ID. For instance, an object's locations may be derived from reading a barcode, considering the size of the object, and/or by recognizing a particular kind of object.

In some examples, a plan for a robotic device may be determined in order to achieve certain configurations of the objects within a target location for the objects. For instance, the goals for loading/unloading or constructing/deconstructing pallets may be to achieve: 1) a dense packing with minimal air gaps in between boxes, and/or 2) a stable packing that won't easily collapse. In some embodiments, stability may require that, in general, heavy objects are on the bottom, and light objects are on top. In other examples, pallets may be created in order to avoid non-interlaced column stacks, column leans, or other characteristics of a bad stack.

In further examples, the pallet or truck/container may be loaded such that work by human operators in subsequent unloading processes is minimized. For instance, in some embodiments, items may be placed in last in, first out order such that, upon unpacking, the items needed first are on top, the items needed second are one layer down and so on. In other examples, the loading of pallets may be independent of how items flow towards the packing cells. Thus, according to some embodiments, the system can handle packages sent in random order or in an order known in advance. In addition, in some embodiments, systems may adapt to changes in the flow of items on the fly. In further examples, one or more boxes may be recorded and buffered by holding the boxes in a temporary storage area where their order can be changed along the way.

According to various embodiments, a 2D simulator and/or a 3D simulator may be utilized for truck or container loading/unloading or for pallet loading/unloading. In some examples, the state of a stack of boxes may be captured in the physical world and input into the simulator. In some embodiments, a variable size queue of boxes from one to all the boxes may be used by a simulator for finding a next box to pick. For example, a queue of 2 boxes or 4 boxes or 10 boxes may be considered by a simulator.

In further examples, the simulator may search over the boxes in the queue to find the best box placement by heuristic algorithms and/or by brute force or multi-resolution search. In some embodiments, the system may increment with increasingly fine placement of boxes around the best sites found in the previously coarser level. In some embodiments, once placement of particular next box has been determined, a physics planner may be used for motion planning in order to move the box efficiently to the determined locations. In further examples, the physical and simulated stacks may be continuously monitored for quality of the stack (e.g., density, stability, and/or order placement). In some examples, the process may be repeated until all the boxes have been placed or the target container can no longer fit in another box.

III. Example Grippers

As mentioned above, example embodiments may relate to methods and systems for causing a robotic manipulator (e.g., a robotic arm) to grip a physical object at a selected grasp point with a gripper and move the physical object through a determined motion path to a drop-off location. As illustrated above in association with FIG. 1A-1B, a robotic arm may be equipped with a gripper such as gripper 104. In particular, the robotic arm may include a suction gripper such as a digital suction grid gripper. However, other types of grippers may also be used.

A suction gripper may include one or more suction valves (also referred to as suction devices or suckers), where each suction valve may be controlled (e.g., turned on or off) in various ways. For example, a detection of whether suction is achieved may be used to determine whether a suction valve is to be turned on or off. Therefore, a digital suction grid gripper, which includes a "digital" grid of suction valves, may be particularly useful for grasping onto different types of surfaces.

Figure 3A:
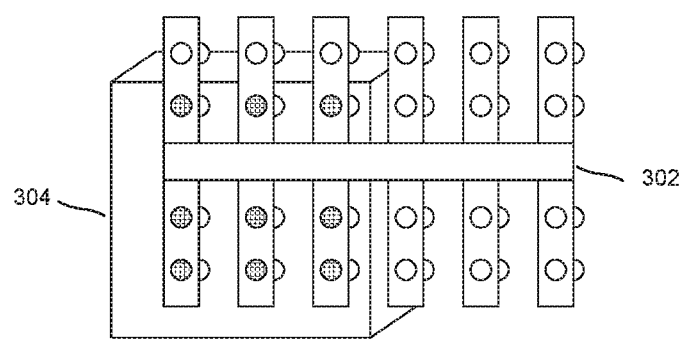
FIG. 3A shows an example configuration for gripping a box using a suction gripper, according to an example embodiment.

To illustrate, consider FIG. 3A showing a suction gripper 302 including 24 suction valves (i.e., a 4 by 6 grid) that are used to grasp a single box 304. For example, the robotic arm may turn on any number of the suction valves as will fit the box sensed for grabbing. The robotic arm may determine, for each suction valve, whether the suction valve is in contact with a surface to grab and may responsively turn on those suction valves which are in contact as well as responsively turn off those suction valves which are not in contact. For instance, as shown in FIG. 3A, nine of the suction valves may be in contact with box 304 (as indicated by the darker circles), and are thus turned on in order to grasp the box at the locations as shown FIG. 3A. On the other hand, the remaining suction valves may not be in contact with the box 304 (as indicated by the white circles) and are thus turned off.

Figure 3B:
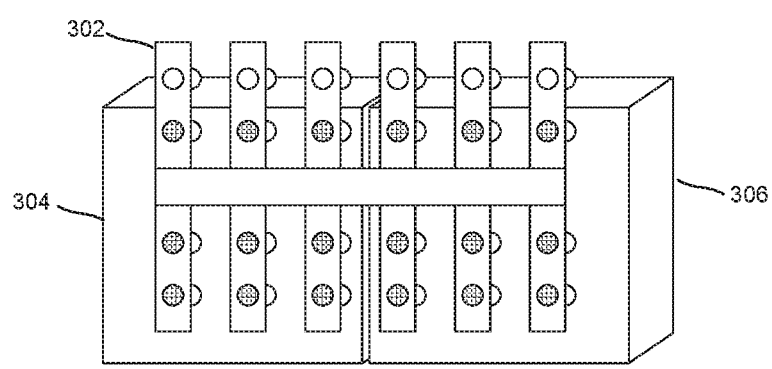
FIG. 3B shows an example configuration for gripping two boxes using a suction gripper, according to an example embodiment.

In another example, the gripper may span several objects and turn on suction for several objects that require pick up. To illustrate, consider FIG. 3B showing an example situation in which a suction gripper may be used to grasp two boxes at once (e.g., boxes 304 and 306). In this case, the robotic arm may turn on any number of the suction valves as will fit the two boxes sensed for grabbing. For instance, as shown in FIG. 3B, eighteen of the suction valves are in contact with boxes 304-306 and are thus turned on in order to grasp the box at the locations as shown in FIG. 3B. On the other hand, the remaining suction valves are not in contact with either box 304 or box 306 and are thus turned off. Other examples may also be possible.

In further examples, the system (e.g., the robotic arm) may determine the presence of a seam in the boxes (i.e., a separation between adjacent boxes) and as a result, suction valves may be turned on, on both sides of the seam, in order to pick up both boxes at once, thereby doubling the throughput. Additionally, in some examples, if a suction valve senses, after a predetermined period of time, that the suction valve cannot grip a surface, then the suction valve may shut off.

Figure 3C:
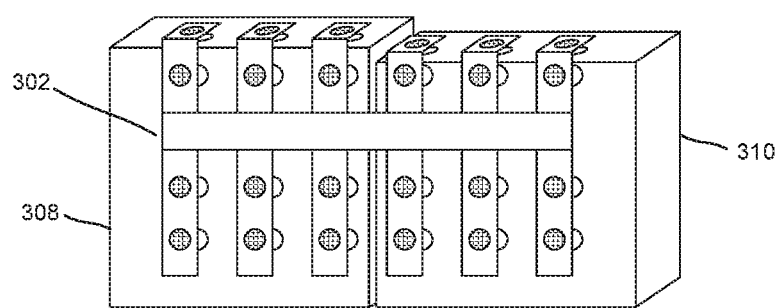
FIG. 3C shows an example configuration for gripping two boxes of different heights using a suction gripper, according to an example embodiment.

In an example embodiment, as mentioned above, a digital suction grid gripper may include an articulated extension. To illustrate, consider FIG. 3C showing suction gripper 302 configured to fold in order to grasp two sides of two boxes 308 and 310, respectively, where the two boxes are of different heights. As shown, sections of the grid may fold down to grasp the top of the boxes. For instance, grippers can be initially at full extension and then conform to the surface being gripped.

Figure 3D:
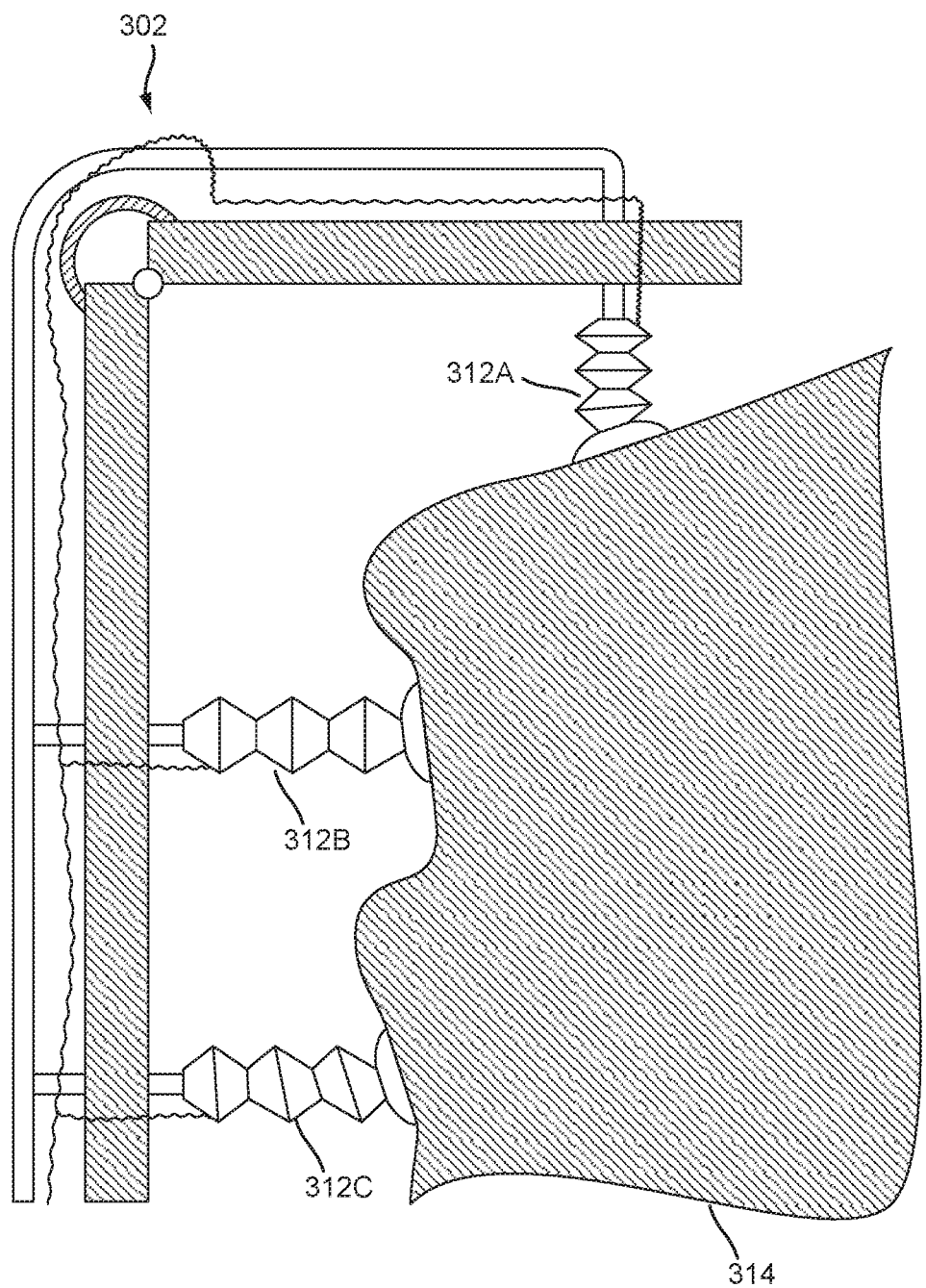
FIG. 3D shows a suction gripper adapting to an irregular surface, according to an example embodiment.

Further, as mentioned above, a suction gripper may be configured to grasp onto any type of surface. For example, FIG. 3D shows a side view of suction gripper 302 including suction valves 312A-C configured to grasp irregular surface 314. In particular, the suction valves 312A-C are each at different angles and distances from a support structure of suction gripper 302. As a result, a suction gripper may be adapted to grasp any type of surface configuration. Other examples may also be possible.

Figure 4A:
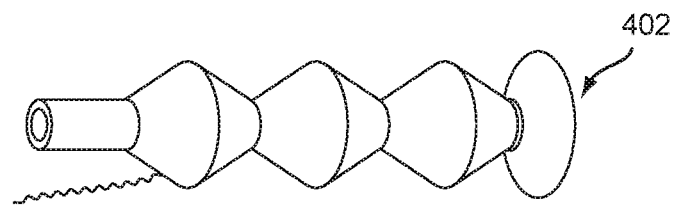
FIG. 4A shows a suction valve at full extension, according to an example embodiment.
Figure 4B:
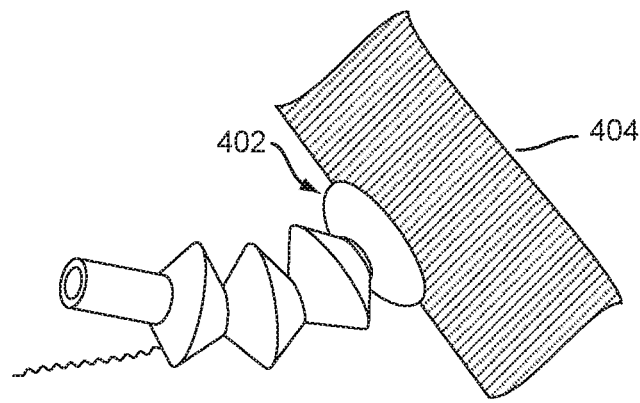
FIG. 4B shows a suction valve flexing to conform to a surface prior to hardening, according to an example embodiment.
Figure 4C:
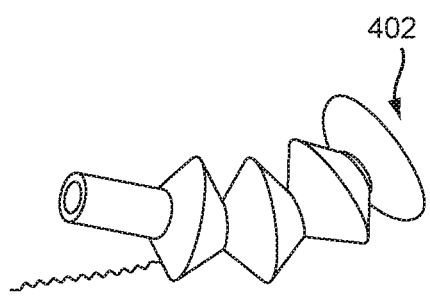
FIG. 4C shows a hardened suction valve configured to provide extra grip to surfaces with lots of curvature, according to an example embodiment.

In some embodiments, suction grippers may be actuated with rheological fluids or powders to allow for a stronger grip on objects with higher curvatures such as irregular surfaces, shapes, and objects. To illustrate, consider FIGS. 4A-C showing an example suction valve 402 with bellows that are filled with a rheological fluid or powder (e.g., sand). A rheological fluid may become fluid or viscous/solid (i.e., hardened) depending on the electrical/magnetic field applied. On the other hand, applying a vacuum to a suction valve with bellows that are filled with the rheological powder causes the powder to stiffen (i.e., harden), while otherwise it is conformable.

As shown in FIG. 4A, the bellows in the suction valve 402 may cause the device to be at full extension when the fluid (or powder) is slack and no surface is in contact. When the suction valve 402 comes into contact with a surface 404, the suction valve 402 may flex to conform to the surface 404, as shown in FIG. 4B, prior to hardening. Once the suction valve 402 conforms to the surface 404, the device may harden as shown in FIG. 4C, giving extra grip to surfaces with lots of curvature. In other words, a magnetic or electric field (for a suction valve containing a rheological fluid) may be turned on and the device may become rigid. Alternatively, a vacuum (for a suction valve containing a rheological powder) may be turned on and the device may become rigid. Such rigidity may help the suction valve grasp irregular surfaces, shapes, and objects such as irregular surface 314 as discussed above. Additionally, such rigidity may help the suction valve grasp multiple objects with variable heights such as boxes 308 and 310 as discussed above. Other examples may also be possible.

IV. Illustrative Methods

Figure 5:
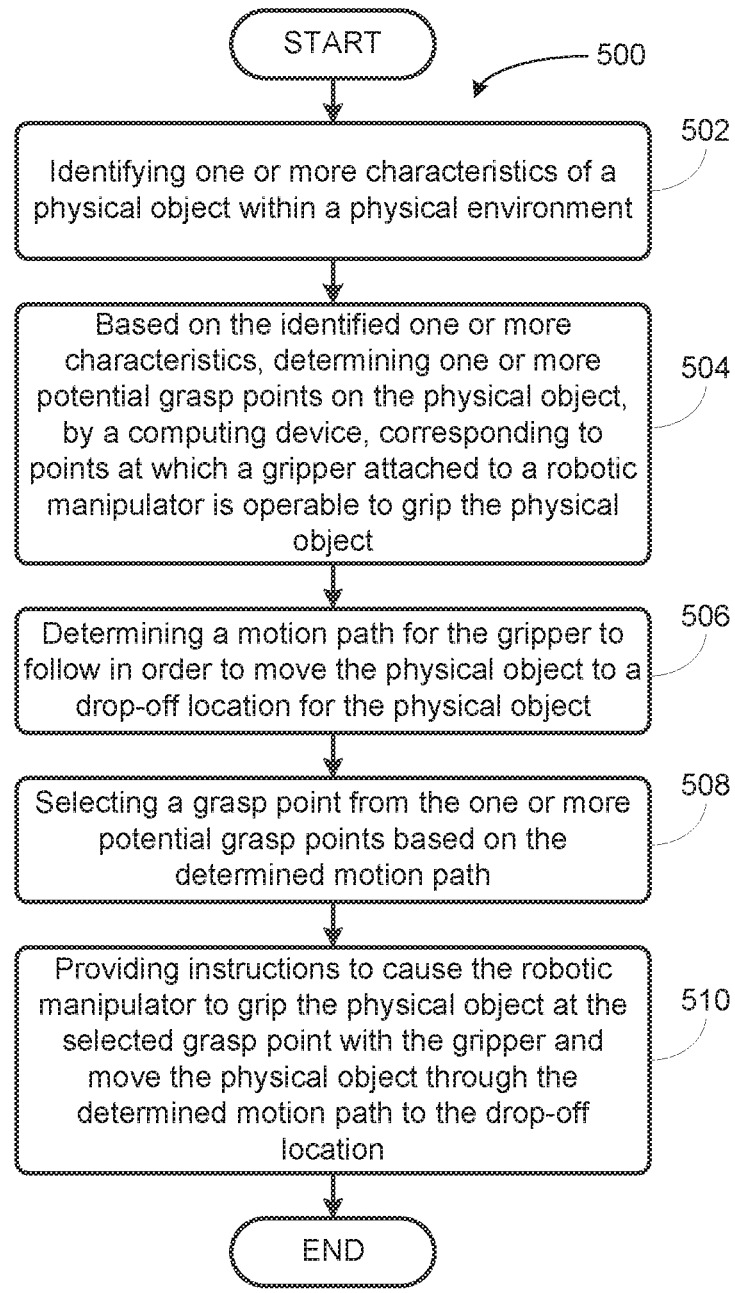
FIG. 5 shows an example flow chart for selecting a grasp point, according to an example embodiment.

FIG. 5 is a flowchart illustrating a method 500, according to an example embodiment. In particular, method 500 may be implemented to cause a robotic manipulator (e.g., a robotic arm) to move a physical object to a drop-off location.

Method 500 shown in FIG. 5 presents an embodiment of a method that can be implemented within an operating environment involving, for example, any robotic device described above, such as a device including a robotic arm mounted on a moveable cart with one or more sensors, as illustrated and described with respect to FIGS. 1A-1B. In other examples, method 500 may be carried out using a robotic manipulator mounted on a different type of movable apparatus, on a rail or track, or at a stationary location. In further examples, part or all of method 500 may be performed by one or more control systems located on a robotic device and/or in remote communication with a robotic device. Additionally, while examples with a single robotic arm may be described, various alternative embodiments may include any number of robotic arms, or may include other automated systems integrated with at least one robotic manipulator.

Additionally, method 500 may include one or more operations, functions, or actions as illustrated by one or more of blocks 502-510. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

Further, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry (e.g., a control system) that is wired to perform the specific logical functions in the process.

At block 502, method 500 involves identifying one or more characteristics of a physical object within a physical environment. A physical object may be any item detected by the robotic arm, where the item is to be moved to a drop-off location. The robotic arm, the physical object, and the drop-off location may all be present within a particular setting defined as the physical environment.

In an example embodiment, a robotic arm may move towards an object, grasp or view the object, and subsequently move to a different location in order to release the object or to get a different view of the object. To make this process efficient, it may be important to identify characteristics of the object as well as plan the path to the object, the grasp or viewpoint on the object, and subsequent motions with the grasped or viewed object.

For instance, as discussed above, the robotic arm may be used to pick up boxes and move the boxes through a motion path to a drop-off location such as a truck. As mentioned above, the term "boxes" may refer to any object or items that can be placed onto a pallet or loaded onto or unloaded from a truck or container. For example, in addition to rectangular solids, "boxes" can refer to cans, drums, tires or any other "simple" shaped geometric items.

Figure 6A:
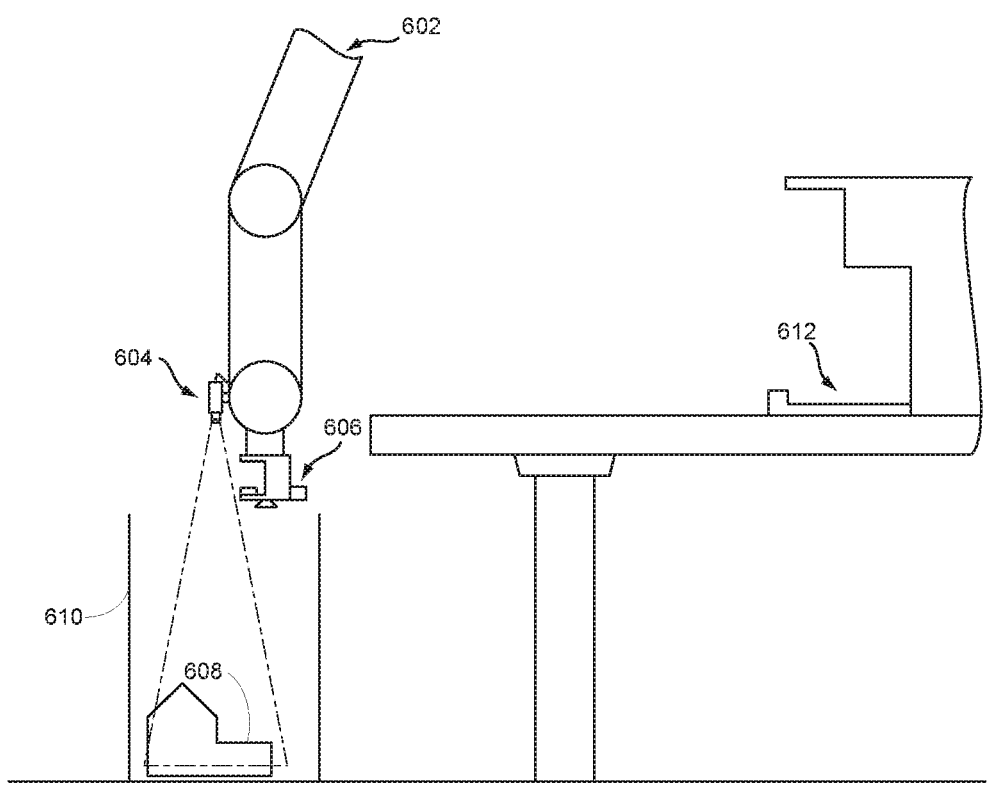
FIG. 6A shows a robotic arm and an object within a physical environment, according to an example embodiment.

To illustrate an example identification of physical object characteristics, consider FIG. 6A showing a robotic arm 602 equipped with a sensor 604 and a gripping component 606 ("gripper 606") for gripping an object 608 located inside a bin 610. The robotic arm 602 may include any of the features as described above in association with robotic arm 102 of FIG. 1A. Additionally, the sensor 604 may include any of the features discussed above in association with sensors 106 and 108 of FIGS. 1A-1B and 1C-2C. Further, gripper 606 may be a digital suction grid gripper as discussed above in association with FIGS. 3A-D; however, any type of gripper may be used. Yet further, for illustration purposes only, object 608 is shown as having an irregular shape. However, object 608 may have any shape such as a box, can, drum, or tire, among other possibilities. Note that the robotic arm 602 may be configured to move the object 608 to drop-off location 612.

As shown in FIG. 6A, the robotic arm 602 may be positioned over the bin 610 in order to analyze the object 608 within the physical environment. In particular, one or more sensors (e.g., sensor 604) on the robotic arm 602 may be used to identify characteristics of the object 608 in order to determine potential grasp points on the object 608. Such grasp point (which may also be referred to as pick points) may be identified by finding surface normals as will be further discussed below in association with block 504 of method 500. Specific processes and techniques for identifying characteristics of a physical object will now be discussed.

In some examples, identifying one or more characteristics of a physical object may involve generating a virtual object based on data received from one or more sensors, where the virtual object corresponds to the physical object, and where the one or more characteristics of the physical object are identified based at least in part on one or more characteristics of the virtual object.

For example, as discussed above, strategies for moving physical objects to a drop-off location may involve a combination of 3D vision/environment construction and motion planning. In particular, the robotic arm may be programmed to move along certain motion paths (e.g., arcs or zigzags) in order to collect sensor data using one or more sensors mounted on the robotic arm. In further examples, scans from multiple sensors may be combined in order to create a single virtual representation of the environment. Note that the process of receiving sensor data from the one or more sensors and determining a virtual representation may be performed by a control system of a robotic device and/or by a remote control system.

In an example embodiment, particular views and perspectives of an object may be used for detecting the object. Such views may be represented by a facade, which is a near-planar construct containing a set of objects, represented as a depth map (e.g., a 2D map of distances as the third dimension). Therefore, a facade may be used to: determine a candidate object to pick up, to move the robotic arm into a particular position in order to get a better view for a robotic arm sensor, and/or to detect the object by finding, for example, the plane of its visible face.

Examples of facades may include: the wall of boxes in a truck, the top of a pallet stack with boxes or other objects, and the top of a bin of disorganized objects. Additionally, a facade may be represented as an orthographic projection of 3D surface information. Such a representation may allow for parsing out the facade to determine areas of interest for a particular application. For example, in truck unloading, the upper left of the next box to pick may be computed from the facade.

Note that one or more detection strategies may be used to detect the box prior to picking it. For instance, detection strategies may include: viewing the whole facade from fixed sensors, using arm-mounted sensors that cover the facade, or using a combination of fixed and arm-mounted sensors, among other possibilities.

In some cases, missed detections of objects may occur. As a result, recovery from missed detections may be carried out by the robotic arm moving slightly to obtain a different view and re-attempting the detection. In the case of moving boxes, graceful degradation in detection capabilities may be carried out by first attempting to detect a full box face. If the first attempt fails, a corner (e.g., the upper left corner) may be used along with an assumption of a width for the box. Note that picking from the top of boxes may be carried out by detecting the top face of the box rather than the front face of the box, or by detecting both the top face and front face simultaneously. Other examples may also be possible.

In other examples, the identified characteristics of the physical object may include a set of geometric characteristics from a particular perspective viewpoint of the physical object, which may then be used to train templates for recognition.

In particular, a comparison can be made between the set of geometric characteristics and one or more virtual geometric shapes from the particular perspective viewpoint of the physical object. Based on an output of the comparison indicating that at least one of the geometric characteristics substantially matches a given virtual geometric shape, a virtual object may be generated that is representative of the physical object and associated with the matching virtual geometric shape. As a result, the identified characteristics of the physical object may be adjusted based on characteristics of the virtual object.

Often a system may recognize a generic set of objects such as boxes, cans, and tires, among other possibilities. In such cases, the system may use a parameterized geometric model or a fused combination of geometric primitives to represent a class of objects (e.g., rectangular solid for boxes, 31) cylinders for cans, a solid cylinder section with a cylindrical hole for tires etc.). The parameters of the model can then be varied to generate templates to recognize limited classes (e.g., boxes, cans, tires) in a restricted range of sizes and orientations. For instance, the system may mathematically generate recognition templates, rectify views to reduce matching dimensions, and/or predict how templates change dynamically with view to improve recognition.

According to various embodiments, for some object classes, the system may mathematically construct models of 3D objects (e.g., from simple geometric objects or any mathematically describable object) to generate the templates instead of constructing them from CAD or real training examples. In the case of boxes, a 3D rectangle description using parametrically generated templates may be used to recognize boxes within a certain range of sizes. In some cases, to improve detection, the system may use 3D information to rectify the 3D view, which may facilitate finding the box boundaries in off-angle detection situations.

In one example, the system may employ active template matching. Once there is a template "hit" (i.e., match) on the object, the system may move the view (or move the object) and subsequently use the predicted change to confirm the recognition. For instance, by rotating the object in (image) plane 10 degrees, the view of the template may also be rotated by 10 degrees. Once the view of the template is rotated, the system may seek to confirm by expecting a high match between the object and template. However, if a match is not confirmed, the system may reconsider the view.

In another example, the system may use mathematical descriptions of geometric objects to rapidly detect 3D surface types such as plane sections and cylinder sections, among other possibilities. This simplified information may be used to rapidly plan grasping, scanning, and movement of the objects since the bounds on its size and orientation are known. For instance, the system may use a local detected surface type (e.g., the long and short sides of a cylinder) for better alignment of the robot gripper. This may help to orient a hand-like gripper or a suction gripper, as discussed above, to maximize adherence to a surface (particularly with electrostatic surface grippers).

In one case, the system may use the above techniques to facilitate faster movement of the object without collision since bounds can be placed around that object encompassing the uncertainty of where exactly it was grabbed. For example, grabbing a can (e.g., cylinder) the system may know that the uncertainty is on the length of the cylinder. However, the uncertainty of length may only be as long as a typical can itself, which may then be used as a bound for motion planning without having to know the real dimensions (which are a subset).

In another case, the system may use the knowledge of how the geometric curvatures or planes are aligned to maximize the accuracy of the object or box metrology (i.e., measurement) step by aligning the surfaces or edges with a camera orientation. In particular, for an object that is moving or for an object that needs to be found in a known different view, the system can project how the object will move and then expect to get a precise fit in the new location.

In an example embodiment, the one or more characteristics of the physical object may be identified based on a plurality of sensor scans of the physical object as the physical object is moving through the physical environment. For example, objects (e.g., boxes) may be moving towards the robotic arm/sensor system via a conveyer belt 110 as discussed above, or down a chute, among other possibilities. Therefore, processes for identifying characteristics of the physical object as the object is moving may be desirable to help segment objects from each other in 3D to make grasping only single objects more certain.

In some cases, techniques such as optical flow, parallax, and frame to frame multi-view depth sensing may be used to segment out individual objects when the objects are moving towards the robotic arm (e.g., a pick and place robot). Optical flow may also be referred to as "same flow" or "common fate", and may be described as the detection of relative motion (e.g., by change of structured light in an image) between sensors and an object. Additionally, parallax may also be referred to as "object boundary common change", and may involve differential movement detection compared to a background. Further, frame to frame multi-view depth sensing may involve treating two images from a moving series of images as a stereo pair. Other examples and techniques may also be possible.

Referring back to FIG. 5, at block 504, method 500 involves, based on the identified one or more characteristics, determining one or more potential grasp points on the physical object, by a computing device, corresponding to points at which a gripper attached to a robotic manipulator is operable to grip the physical object.

In an example embodiment, determination of grasp points on the object may depend on the characteristics of the objects themselves as well as the gripper type. In particular, various object surface characteristics may be used to determine potential grasp points. For instance, these features may be chosen based on the end effector (e.g., a gripper) design and the classes of objects to be grasped.

In one case, such as for suction grippers, locally smooth patches (e.g., flat areas) may be selected. In other words, determining the one or more potential grasp points may include an identification of one or more flat areas on the physical object. As a result, the gripper may use suction to grip objects. Additionally, for soft objects, statistical surface analysis may be used to find locations where suction (or other forms of grasping as appropriate to the robotic manipulator) is likely to succeed. In some examples, the identified flat areas may be larger in area than a gripping surface of the gripper.

In another case, the gripper may be a two finger gripper that is configured to clamp onto two points on the object. As a result, the robotic manipulator may be required to identify at least two points on the object in order to successfully grasp the object. In particular, identifying two points on the object may involve identifying two points on two different surfaces of the object that have approximately a 180 degree difference in surface orientation. Other gripper types and examples may also be possible.

In an example embodiment, potential grasp points on the physical object may be identified by finding spatial clusters of coherently oriented surface normals. In particular, the system may make use of regular organization of surface normals as a good grasp point for suction or electrostatic grippers to pick up an object. Such areas of coherently oriented surface normals are often points of low surface curvature (also referred to as "flat spots") that work well for suction or electrostatic grabbing devices.

Figure 6B:
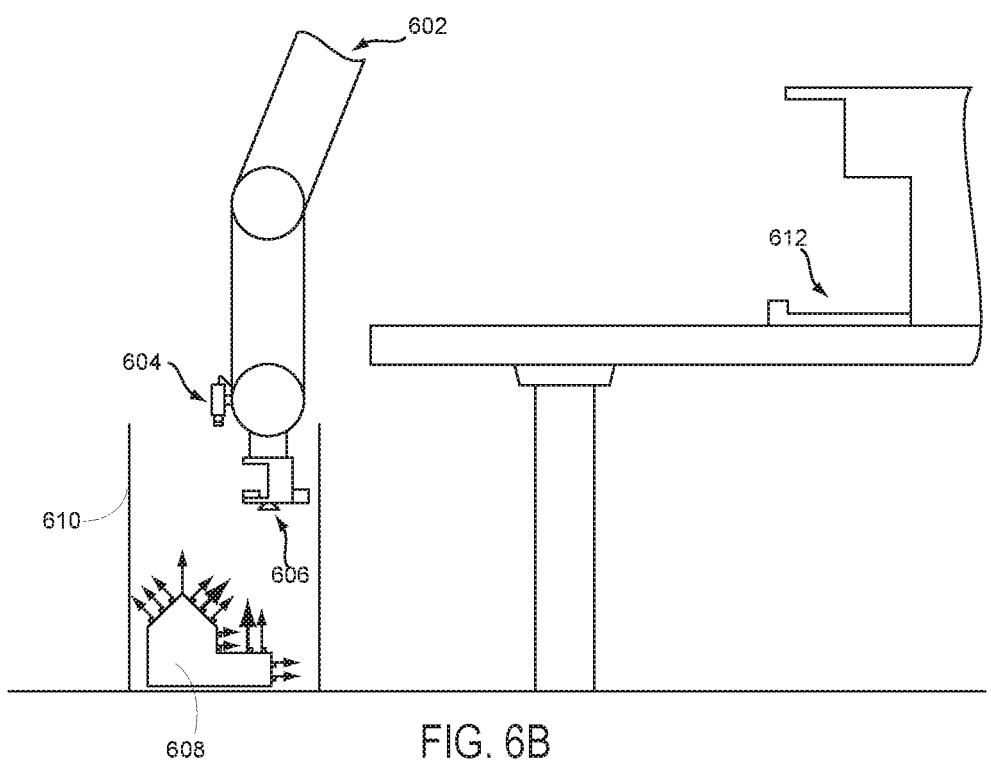
FIG. 6B shows a robotic arm and an object with several potential grasp points, according to an example embodiment.

To illustrate, consider FIG. 6B showing the robotic arm 602 as introduced in FIG. 6A, where the robotic arm 602 is configured to move the object 608 located inside the bin 610 to the drop-off location 612. As shown in FIG. 6B, the robotic arm 602 is on an approach path towards the object 608, where the object 608 exhibits surface normals that represent flat spots on the object 608.

In particular, the surface normals (i.e., the graspable features) may allow for estimation of approach trajectories. For instance, suction gripper protocols typically require an approach to an object that is normal to the surface of the object, in order for the suction valve to flatly contact the object and create a vacuum seal against the object. In another instance, if a two finger gripper is used, it may be desirable to find "narrow enough" regions on an object where normal surfaces are approximately 180 degrees apart, in order for the fingers to clamp down on the normal surfaces (e.g., 2 opposite sides of a small box or 2 sides of a cylinder).

As shown in FIG. 6B, the location of the object 608 is considered in determining potential grasp points. For example, as discussed above, object 608 is located in bin 610. As a result, potential grasp points may only include points at which the gripper 604, attached to the robotic arm 602, is operable to grip the object 608. In particular, this is demonstrated by the surface normals shown in FIG. 6B, where only surface normals (i.e., potential grasp points) that can be reached by an approach path of the robotic arm 602 are shown.

Note that the location of the bin 610, with respect to other local obstacles and/or fixtures in the physical environment, may be further considered in narrowing down the potential grasp points. In other words, the techniques described herein may be used to determine the most feasible grasping points that minimize collisions with other objects or surfaces within the environment. Further, note that in addition to the surrounding environment, the object size may also be used in determination of potential grasp points.

Further, selecting potential grasp points may also involve an evaluation of possible robotic arm configurations when the robotic arm grasps onto the object. In other words, each potential grasp point may be selected with the possibility of several robotic arm configurations as the gripper grasps the potential grasp point. For example, consider the potential grasp point illustrated by the vertical bold surface normal as shown in FIG. 6B (i.e., the large surface normal on the right). This potential grasp point may be grasped at several different robotic arm configurations. For instance, the robotic arm 602 may be slightly flexed (as illustrated in FIG. 6B) or the robotic arm may extended (e.g., at 180 degrees) when grasping onto object 608. Therefore, in addition to the evaluation of graspable features, approach trajectories, nearby objects, and other factors, the system may also evaluate the possible robotic arm configurations for each potential grasp point. As a result, the system may select potential grasp point at specific robotic arm configurations that ensure collisions will be avoided during the approach path and/or while the object is picked up. Other examples may also be possible. Note that the techniques discussed below may be used in evaluation of robotic arm configurations.

A robotic arm may have limitations on the positions (i.e. configurations) that the robotic arm can achieve as well as the speed with which the robotic arm can move from one position to another. Thus, the system may be configured to make the distinction between. Cartesian space and joint space. For instance, Cartesian space may be the normal 3D space that the robotic arm may use to operate in the physical environment. For example, it may be desirable to move the gripper to a certain position in the environment. Therefore, the gripper position may be specified by XYZ coordinates, while rotation to a certain angle may be specified, for example, with Euler angles.

On the other hand, joint space is the concatenation of the translational and angular displacements of each joint of a robotic link. As such, to command the robotic arm, the joint angles may be specified at each of the robotic arm's joints. For example, a typical industrial robot may have six joints (e.g., three in the wrist for rotation, and three at the shoulder and elbow for positioning the wrist in XYZ). As a result, such a robot may position a tool (e.g. a gripper at the end of the robotic) at an arbitrary six degree-of-freedom Cartesian pose (e.g., XYZ and three Euler angles), within some limitations.

A translation from joint angles to Cartesian pose of the tool is called forward kinematics (FK). On the other hand, a translation from a Cartesian pose to joint angles is called inverse kinematics (IK). One possible issue with IK may be that there can be many solutions (e.g., up to sixteen or thirty two on some robotic arms) for each Cartesian pose. For example, in the case of a robot with seven joints, there may be an infinite number of joint positions that correspond to a given Cartesian pose. Therefore, since a gripper position may be specified in Cartesian coordinates, the system may be configured to select among these solutions when commanding the robot to move.

The solution to finding an appropriate set of commanded joint angles may be framed as an optimization problem. For example, the object may be viewed with a camera or depth device placed at the end of a robotic arm. The camera may be configured to look at the object within a certain distance bound (e.g., 1-2 meters). Additionally, the camera may be oriented such that the entire object appears in the image. Further, additional criteria may include, for example, restricting the viewing angles to a subset of the available angles with respect to a surface on the object, or setting the joint values as close to zero as possible. These criteria may be converted into a cost function that specifies the relative weight of each criterion, and may be entered into a nonlinear optimization program to determine a solution that minimizes the cost function.

Similar techniques of finding an appropriate set of commanded joint angles may be used in additional situations such as determination of a potential grasp point. First, the system may be configured to find all possible locations in Cartesian space that would be appropriate for gripping the object (e.g., at the top of a box, or on its front face). Each such location may have an associated weight. For instance, it may be desirable to pick a box from the top rather than a front face. Subsequently, additional criteria may be introduces such as, for example, configuring the gripper and the end of the robotic arm to be as far away as possible from other objects. Further, other criteria as discussed above may also be introduced such as, for example, having joint values as close to zero as possible. These criteria may be converted into a cost function that specifies the relative weight of each criterion, and may be entered into a nonlinear optimization program to determine a solution that minimizes the cost function for joint angles required to achieve the goal position.

In some cases, the system may use learned and/or cached knowledge to initialize the process of finding an appropriate joint configuration to satisfy a tasks such as finding a goal position to determine potential grasp points. Use of initialization may make the process of nonlinear optimization more efficient, and may result in finding a better solution. Cached initial solutions may be learned by running simulations over a large set of typical problems. For example, in finding appropriate view poses for boxes in a facade, the system may simulate the robotic arm looking at boxes in many different positions in the facade. For each position, the system may randomly sample a large set of initializations, and run the optimizer. Subsequently, the system may select the best solution from all of those discovered, and store it along with the position of the box in the facade. Such a learning process may be lengthy, and may be done offline (in some cases, with the assistance of additional computers to run many different simulations in parallel). The results may be saved in a look-up table, so that when running online, the system may find the nearest cached situation in the look-up table, and use the corresponding solution as an initialization for the nonlinear optimization. Other examples of using cached knowledge for initialization may include: finding appropriate poses on objects, and switching from front picks to top picks when picking a facade of boxes. Note that an additional discussion of learning techniques and storing information is presented below.

In an example embodiment, potential grasp points on the physical object may be determined by identifying a fiducial mark in a particular point on a virtual object, where the fiducial mark indicates a reference point for gripping the physical object. Subsequently, the system (e.g., the robotic arm) may determine a point on the physical object corresponding to the fiducial mark as one of the potential grasp points.

For instance, during model capture (e.g., generation of a virtual object), a user can mark the object under reconstruction with fiducial marks for automatic detection of important points or features. Alternatively, the user can mark a constructed CAD model in a viewing window. Subsequently, when an object is detected and is matched to the CAD model, the fiducial marks may be present in the CAD model, and can thus be used for control of various operations such as picking or grasping the object, machining, painting, or gluing, among other possibilities.

At block 506, method 500 involves determining a motion path for the gripper to follow in order to move the physical object to a drop-off location for the physical object. Various techniques may be used for determination of a motion path. For instance, a combination of perception together with path planning may be used to guide the robotic arm to pick up a box and place it in a drop-off location.

In an example embodiment, the robotic arm may scan the physical environment, as demonstrated by FIG. 6A, and use perception of the physical environment as a basis for a path planning algorithm. While scanning the environment, a facade of the physical object may be recorded. The facade may then be used to develop a plan for picking up the physical object. For example, in the case of a box, all the recognition templates and their perturbations may be mathematically generated based on the geometry of the box.

A path planning algorithm may involve path constraints, such as collision avoidance and quickest movement path, which can be input to a constraint-based planning solver and solved for to yield a path (or optimal path) to move the robotic arm. Additionally, in some cases, the solver may also determine a path for picking up, moving and placing the object.

Planning a collision-free path may involve determining the "virtual" location of objects and surfaces in the environment. For example, a path optimizer may make use of the 3D information provided by environment reconstruction to optimize paths in the presence of obstacles, such as bin 610 as shown in FIGS. 6A-6B.

Various techniques may be used to optimize a path. In one example, a representation of an environment may be captured as a mesh or set of 3D points. The robotic arm may then be represented as a convex hull of plane segments for quick collision checking. As a result, constant or frequent updating of the environment may allow the robotic arm to quickly respond to changes.

In another example, an optimizer may perform frequent continuous collision checking throughout its path. For example, an optimizer may accept arbitrary constraints in the form of costs such as: keeping a particular distance away from objects, and to approach a goal position from a given angle, among other possibilities. Further, an optimizer may avoid robot fault conditions by working in joint space, keeping track of windup, and choosing goal positions from among multiple inverse kinematics solutions. For instance, one strategy for motion planning may involve looking ahead several moves to evaluate whether the chosen goal joint position will be acceptable for the next move.

In an example embodiment, the robotic arm may move along a path, from its initial pose to a grasp or viewpoint pose, and then to a drop-off pose or a second viewpoint pose. Solving for the best joint position at each Cartesian pose in this chain may be done individually. However, a more desirable robot motion may be achieved by considering all poses at once. For example, consider the case of going to an object, grasping it, and then dropping it off at a drop-off location as discussed herein. In this case, there may be two goal poses in Cartesian space such as the grasping pose and the drop-off pose. Each of these may have multiple solutions in joint space. Therefore, the system may be configured for optimization of the joint space solutions for the two poses together.

For instance, the robotic arm motion may go through N poses, each of which may have multiple joint space solutions. Additionally, there may be multiple criteria at each pose or between poses. For example, the system may be configured to minimize the joint rotations necessary to go from one pose to the next. To solve this problem, the system may be configured to set up the problem as a dynamic programming problem. In particular, at each Cartesian goal pose, the system may define the set of joint space solutions corresponding to that pose. Additionally, for each pair of joint space solutions in neighboring goals, the system may compute an optimal path between the joint configurations. Each such path may have a weight or cost assigned to it, based on criteria previously stated above (e.g., how long the path is, how close the joints are to zero at the end). Subsequently, using dynamic programming, the system may select the desirable connected path from the start position to the end goal. As such, dynamic programming may determine the most appropriate path, in the sense that the path has the smallest cost of all the connected paths from start to goal.

To set up the path optimization problem, the system may construct a set of waypoints in joint space which define the path, with the first waypoint being the start position, and the last waypoint the goal position. In some cases, the number of waypoints may vary from ten to fifty, depending on the complexity of the path. Subsequently, the system may add various criteria as cost functions in the optimization. Such criteria may include but are not limited to: (a) even spacing (e.g., the waypoints should be evenly spaced in Cartesian space), (b) collision checking with objects in the environment which may be carried out for a swept volume between each waypoint, (c) the orientation of the grasped object should change as little as possible, (d) the path should be as smooth as possible, and (e) maintaining the joint angles of the robotic within bounds, among other possibilities. Note that if a constrained optimizer is available, some criteria may be included as constraints the joint limits of the robot, or collisions with objects).

In some cases, optimization may be used in Cartesian space to facilitate motions where the robotic arm is moving an object in near-contact with other object. In other words, instead of solving the problem in joint space, the system may re-phrase the problem to use Cartesian space coordinates, with restrictions on the motion. For example, in pulling a box out from among other boxes, the system may specify that the box is not rotated during pull-out. Solving such a problem in Cartesian space may lead to a smoother path than the joint space solution. The end result of such a solution may be a set of waypoints in Cartesian space which may be converted to joint space waypoints using the dynamic programming techniques discussed above.

Referring back to FIG. 5, at block 508, method 500 involves selecting a grasp point from the one or more potential grasp points based on the determined motion path. Techniques described herein may consider the total path and physical constraints of movement, collisions, and robot joint configurations to select a grasp point.

In an example embodiment, a grasp point on an object may be determined based on global considerations of the whole task or whole path to be taken. In other words, the motion path may be optimized together with grasp point selection over the whole task. For instance, 2D or 3D models may be combined with 2D or 3D surface perception in the physical environment (in a global optimization) to select the grasp point, robot joint motion, and/or path plan.

In one case, selecting the grasp point from the one or more potential grasp points further may include rejecting one or more potential grasp points that result in a collision with an obstructing object when the robotic manipulator moves towards the physical object in order to grip the physical object at the selected grasp point with the gripper. For example, as shown in FIG. 6B, as the robotic arm 602 approaches the object 608, the arm (or computing device) selects an approach that seeks to avoid a collision with bin 610.

In another case, selecting the grasp point from the one or more potential grasp points may include rejecting one or more potential grasp points that result in a collision with an obstructing object when the robotic manipulator moves the physical object through the determined motion path to the drop-off location. For example, as shown in FIGS. 6A-6B, as the robotic arm 602 analyzes the physical environment and approaches object 608, the robotic arm 602 may select a grasp point that ensures a collision with obstructing objects (e.g., bin 610, the platform of the drop-off location 612) is avoided.

In yet another case, selecting the grasp point from the one or more potential grasp points may include selecting the grasp point based on geometric characteristics of the drop-off location such that the one or more identified characteristics of the physical object accommodate the geometric characteristics of the drop-off location. For example, object 608 is shown as having an irregular shape and drop-off location 612 is configured to accommodate certain sizes and shapes. Therefore, it may be desirable to select a grasp point such that when the robotic arm 602 moves the object 608 through the motion path, the object 608 can be properly placed in the drop-off location 612.

In one example, the system may consider other objects to be placed at the drop-off location in the future, and responsively select a grasp point that may allow for accommodation of multiple objects (with potentially varying shapes and sizes) at the drop-off location. In another example, the system may also consider the desired order in which multiple objects are to be placed at the drop-off location. In yet another example, the system may select a grasp point which may ensure that the object does not tip over when the object is placed at the drop-off location. Other examples may also be possible.

Note, that the motion path may be further adjusted after the robotic arm grasps the object at the selected grasp point. This may be done to avoid collisions with objects that were not previously in the physical environment and/or objects that have moved to a different physical location within the environment. Further, note that any combination of the above cases may be possible for the process of selecting a grasp point. However, other cases may also be possible.

An example of the selection of a grasp point is shown in FIG. 6B. FIG. 6B shows an object in the bin 610 together with surface normals on that object produced by processing depth data from a depth sensing device. In particular, FIG. 6B shows that when the local configuration of the robot arm is considered along with its suction gripper and the bin that contains the object, there may only be two feasible grasp points as illustrated by the bold/larger surface normals on the object 608. Based on the model of the object 608, the robotic arm 602, the sensed physical environment, and the goal drop-off location 612, a single grasp point may be selected.

Figure 6C:
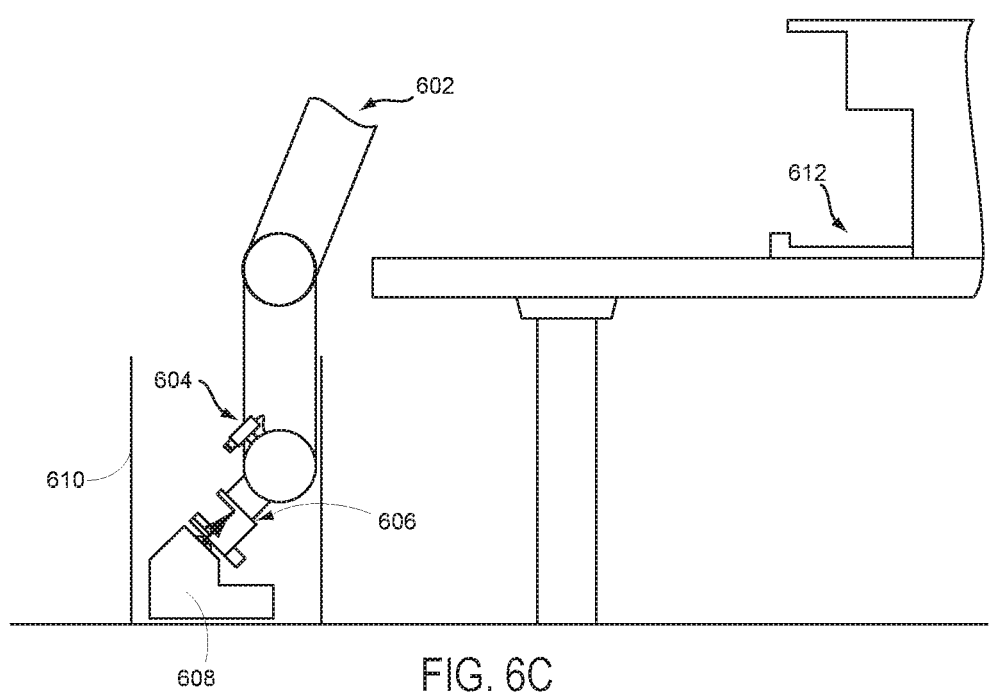
FIG. 6C shows a robotic arm grasping onto an object at a selected grasp point, according to an example embodiment.

To illustrate, consider FIG. 6C showing the robotic arm 602 physically grasping onto the object 608 at a selected grasp point. In particular, the remaining surface normal represents the selected grasp point. For example, the shown grasp point may have been selected in order to avoid a collision with the bin later on as the robotic arm 602 moves the object 608 through a planned motion path. Possible considerations for determining a grasp point include known models, sensed models, sensed scene surfaces, joint angles, planned motion path, potential grasp points, and/or arm windup to help select a grasp point. Other examples may also be possible.

Referring back to FIG. 5, at block 510, method 500 involves providing instructions to cause the robotic manipulator to grip the physical object at the selected grasp point with the gripper and move the physical object through the determined motion path to the drop-off location.

Figure 6D:
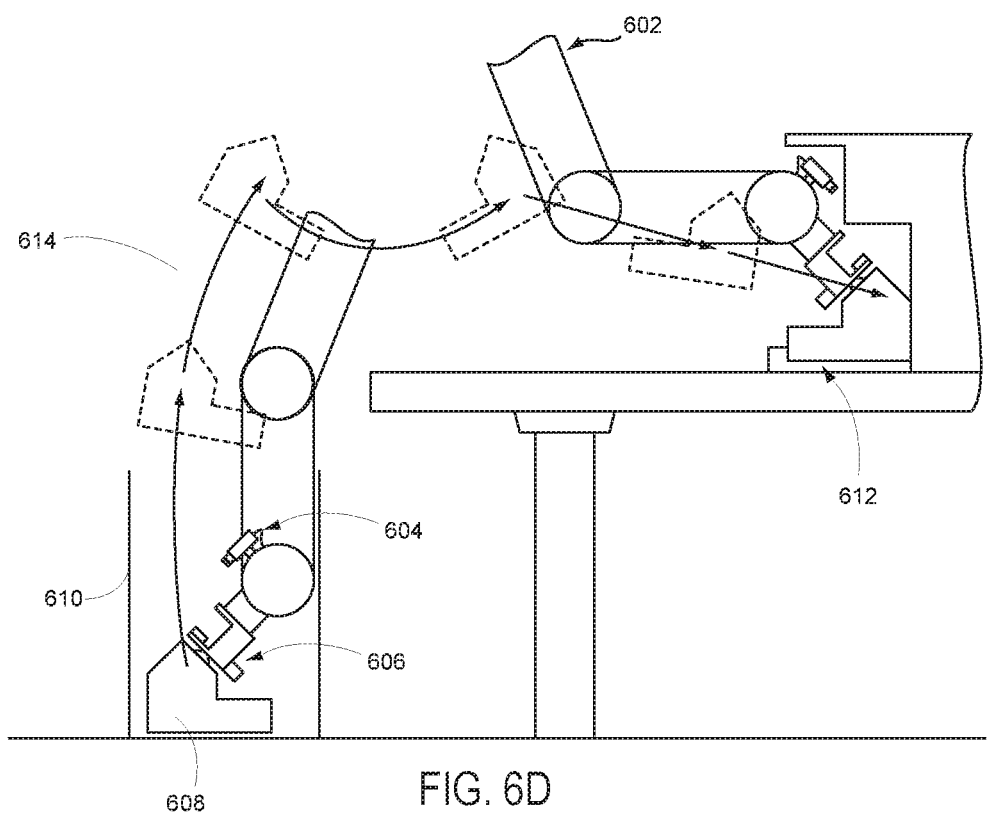
FIG. 6D shows a robotic arm moving an object through a motion path, according to an example embodiment.

To illustrate, consider FIG. 6D showing the robotic arm 602 moving object 608 through a determined motion path 614 to the drop-off location 612 and subsequently, the robotic arm 602 places the object at the drop-off location 612. Note that, while a particular motion path 614 is shown, multiple motion paths may be possible to achieve the same result. Further, note that the robotic arm 602 changes the orientation of the object 608 along the motion path 614 such that the object 608 accommodates the drop-off location 612 as discussed above.

Additionally, the robotic arm 602 may determine if one or more adjacent physical objects are in contact with the object 608. If adjacent physical object are in contact with the object 608, instructions may be provided to cause the robotic arm 602 to create space between the object 608 and adjacent physical object by using the gripper 606 to cause the object 608 to alternately move in at least two opposing directions ("wiggle") prior to moving the object 608 through the determined motion path 614. Note that this may reduce the likelihood that adjacent objects are tossed up or misarranged as the object 608 of interest is moved. Further, note that when a suction gripper is used, better adhesion may often be achieved by "wiggling" the object 608 as the object is being grasped at the selected grasp point.

V. Additional Features

In an example embodiment, the system may make use of specifically learned pick up points to yield efficient object specific pick up in any orientation the object might be in. For example, the robotic arm may analyze the physical environment and use various sensors to form a 3D model and subsequently grasp the object at a selected grasp point based on various factors. Each time this occurs, the robotic arm may evaluate how well the pick point performed (e.g., in terms of slippage) and store that knowledge.

In another example, as the 3D model forms, the robotic arm may go through repeated experimentation using grasp points. For instance, the robotic arm may pick up the object and learn its weight distribution. The model and its weight may then be entered into a simulator to evaluate potential grasp points. As a result, many virtual grasps may be tried and evaluated, and the best grasps may be retained.

In particular, information stored (e.g., in a memory storage) may includes the identified characteristics of the object, the selected grasp point, and/or the determined motion path, among other possibilities. In some cases, a performance evaluation of the selected grasp point may be performed, where the evaluation may be based on the movement of the object through the determined motion path to the drop-off location. Subsequently, the performance evaluation may also be stored.

Subsequently, in run time, when an object is recognized, the stored information may be accessed and the grasp points may be looked up. In other words, the stored information may be used to determine other grasp points for the robotic manipulator to use in picking up additional physical objects from the physical environment. As a result, grasp points may be evaluated for reachability, motion planning, and placement in order to choose a grasp point. Additionally, the stored information may also be sent to a second robotic manipulator to determine grasp points for the second robotic manipulator to use to pick up physical objects from a physical environment.

In an example embodiment, various techniques may also be used to train a robotic manipulator to "pick and place" objects into fixtures or other complex arrangements. For example, a robotic arm may be trained by example via reversing the movements and manipulations for a task. In particular, oriented calibration "pucks" may be used to help the robotic manipulator determine where to move. Such pucks may be used as markers, for instance, to specify "from" and "to" locations. In other works, the pucks may indicate a starting location for the robotic manipulator and an end location such that the robotic manipulator can train to move certain objects via certain motion paths.

For training a robotic manipulator by example, training may be made easier by "going in reverse." For instance, the training procedure may be started from the end and go to the beginning. The robotic manipulator may then know its end goals first and backtracks how it can get to those end states. Additionally, the robotic manipulator may make use of a global (or local) path planning algorithm such as described above to fill in the parts of the path that were not explicitly specified.

In one example, for putting items from a bin into a fixture as shown in FIGS. 6A-D, the system may start with the object 608 in the fixture gripped by the robotic arm 602 so that the robotic arm knows the end state and then lift the object 608 out and move it to the bin 610 so that the robotic arm backtracks and sees the overall motion into the end state. Subsequently, the robotic arm 602 may be moved so that the object 608 is in the bin 610 and then release the gripper 606 such that the robotic arm 602 sees its start state.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method comprising:
    determining two or more potential grasp points on a physical object corresponding to points at which a gripper attached to a robotic manipulator is operable to grip the physical object;
    before grasping the physical object, determining a planned motion path for the gripper to follow in order to move the physical object to a drop-off location for the physical object;
    selecting, based on the determined planned motion path, a first grasp point on the physical object from among the two or more potential grasp points; and
    providing instructions to cause the robotic manipulator to grip the physical object at the selected first grasp point on the physical object with the gripper and move the physical object through the determined planned motion path to the drop-off location.

2. The method of claim 1, further comprising:
    receiving at least one sensor scan of the physical object, wherein determining the two or more potential grasp points on the physical object is based at least in part on the at least one sensor scan of the physical object.

3. The method of claim 1, wherein determining the two or more potential grasp points comprises identifying two or more flat areas on the physical object and determining that the identified two or more flat areas are each a potential grasp point.

4. The method of claim 3, wherein the gripper uses suction to grip objects, and wherein the identified two or more flat areas are each larger in area than a gripping surface of the gripper.

5. The method of claim 1, wherein the selected first grasp point comprises a first point on a first surface of the physical object and a second point on a second surface of the physical object, wherein the first and second surfaces have opposite surface orientations, and wherein the gripper comprises a two finger gripper configured to clamp onto the identified first and second points.

6. The method of claim 1, wherein selecting the first grasp point comprises:
    determining that the robotic manipulator moving along the planned motion path after grasping the physical object at a second grasp point from among the two or more potential grasp points is expected to result in a collision of the robotic manipulator with an obstructing object.

7. The method of claim 1, wherein selecting the first grasp point comprises:
    determining that the robotic manipulator dropping off the physical object at the drop-off location while gripping the physical object at a second grasp point from among the two or more potential grasp points is expected to result in a collision between the physical object and an obstructing object positioned at the drop-off location.

8. The method of claim 1, wherein determining the planned motion path for the gripper comprises determining a sequence of joint angles for the robotic manipulator that minimizes a cost function, wherein the cost function comprises a plurality of weighted criterion associated with different characteristics of the planned motion path.

9. The method of claim 1, wherein determining the planned motion path for the gripper comprises determining a sequence of cartesian coordinates for the physical object that minimizes a cost function, wherein the cost function comprises a plurality of weighted criterion associated with different characteristics of the planned motion path.

10. The method of claim 1, wherein selecting the first grasp point from among the two or more potential grasp points comprises minimizing a cost function, wherein the cost function comprises a plurality of weighted criterion associated with different characteristics of the first grasp point.

11. The method of claim 1, wherein selecting the first grasp point from among the two or more potential grasp points comprises minimizing a cost function, wherein the cost function comprises:
    a plurality of weighted criterion associated with different characteristics of a pose of the robotic manipulator at the first grasp point; and
    a plurality of weighted criterion associated with different characteristics of a pose of the robotic manipulator at the drop-off location.

12. The method of claim 1, further comprising:
    storing information, in a memory storage, comprising: (i) the selected first grasp point, (ii) the determined planned motion path, and (iii) a performance evaluation of the selected first grasp point based on the movement of the physical object to the drop-off location.

13. The method of claim 12, further comprising:
    using the stored information to determine other grasp points for the robotic manipulator to use in picking up additional physical objects from a physical environment.

14. The method of claim 12, further comprising:
    providing the stored information to a second robotic manipulator to determine grasp points for the second robotic manipulator to use to pick up physical objects from a physical environment.

15. The method of claim 1, further comprising:
determining one or more adjacent physical objects in contact with the physical object; and
providing instructions to cause the robotic manipulator to create space between the physical object and the one or more adjacent physical objects by using the gripper to cause the physical object to alternately move in at least two opposing directions prior to moving the physical object through the determined planned motion path.

16. The method of claim 1, further comprising:
identifying a fiducial mark at a particular point on a virtual object representative of the physical object, wherein the fiducial mark indicates a reference point for gripping the physical object; and
determining a point on the physical object corresponding to the fiducial mark as one of the two or more potential grasp points.

17. A system comprising:
a robotic manipulator;
a gripper attached to the robotic manipulator; and
a control system configured to:
determine two or more potential grasp points on a physical object corresponding to points at which the gripper attached to the robotic manipulator is operable to grip the physical object;
before grasping the physical object, determine a planned motion path for the gripper to follow in order to move the physical object to a drop-off location for the physical object;
select, based on the determined planned motion path, a first grasp point on the physical object from among the two or more potential grasp points; and
provide instructions to cause the robotic manipulator to grip the physical object at the selected first grasp point on the physical object with the gripper and move the physical object through the determined planned motion path to the drop-off location.

18. The system of claim 17, wherein the control system is further configured to determine, before selecting the first grasp point, that the robotic manipulator moving along the planned motion path after grasping the physical object at a second grasp point from among the two or more potential grasp points is expected to result in a collision of the robotic manipulator with an obstructing object.

19. A non-transitory computer readable medium having stored therein instructions, that when executed by a computing device, cause the computing device to perform functions comprising:
determining two or more potential grasp points on a physical object corresponding to points at which a gripper attached to a robotic manipulator is operable to grip the physical object;
before grasping the physical object, determining a planned motion path for the gripper to follow in order to move the physical object to a drop-off location for the physical object;
selecting, based on the determined planned motion path, a first grasp point on the physical object from among the two or more potential grasp points; and
providing instructions to cause the robotic manipulator to grip the physical object at the selected first grasp point on the physical object with the gripper and move the physical object through the determined planned motion path to the drop-off location.

20. The non-transitory computer readable medium of claim 19, wherein selecting the first grasp point comprises:
determining that the robotic manipulator moving along the planned motion path after grasping the physical object at a second grasp point from among the two or more potential grasp points is expected to result in a collision of the robotic manipulator with an obstructing object.

* * * * *